US011891699B2

(12) United States Patent
Fujikawa et al.

(10) Patent No.: US 11,891,699 B2
(45) Date of Patent: Feb. 6, 2024

(54) COLD SPRAY NOZZLE AND COLD SPRAY DEVICE

(71) Applicant: NISSAN MOTOR CO., LTD., Yokohama (JP)

(72) Inventors: Masahito Fujikawa, Kanagawa (JP); Hidenobu Matsuyama, Kanagawa (JP); Eiji Shiotani, Kanagawa (JP); Yoshitsugu Noshi, Kanagawa (JP); Hirohisa Shibayama, Kanagawa (JP); Koukichi Kamada, Kanagawa (JP); Naoki Okamoto, Kanagawa (JP); Junichi Hamasaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 183 days.

(21) Appl. No.: 17/257,937

(22) PCT Filed: Jul. 6, 2018

(86) PCT No.: PCT/JP2018/025754
§ 371 (c)(1),
(2) Date: Jan. 5, 2021

(87) PCT Pub. No.: WO2020/008637
PCT Pub. Date: Jan. 9, 2020

(65) Prior Publication Data

US 2021/0164108 A1 Jun. 3, 2021

(51) Int. Cl.
*C23C 24/04* (2006.01)
*B05B 7/16* (2006.01)

(52) U.S. Cl.
CPC ................ *C23C 24/04* (2013.01); *B05B 7/16* (2013.01)

(58) Field of Classification Search
None
See application file for complete search history.

(56) References Cited

U.S. PATENT DOCUMENTS

2010/0136242 A1* 6/2010 Kay ...................... B05B 7/1486 427/427
2019/0184417 A1* 6/2019 Binek .................. B05B 7/1486

FOREIGN PATENT DOCUMENTS

| | | | |
|---|---|---|---|
| CN | 1519057 | A | 8/2004 |
| CN | 1619204 | A | 5/2005 |
| CN | 201291931 | Y | 8/2009 |
| CN | 102847621 | A | 1/2013 |
| CN | 104114746 | A | 10/2014 |
| CN | 105363589 | A | 3/2016 |
| JP | 2009-632 | A | 1/2009 |

* cited by examiner

*Primary Examiner* — Michael P. Rodriguez
(74) *Attorney, Agent, or Firm* — Foley & Lardner LLP

(57) ABSTRACT

The nozzle for cold spray (25) used in a cold spray apparatus (2) is configured to include a tubular nozzle main body (252) and a cooling jacket (253) that surrounds the nozzle main body (252) to form a flow path (**25*e*) for refrigerant (R) between the nozzle main body (252) and the cooling jacket (253). The cooling jacket (253) is provided with a seal retaining portion (253*c*) that retains an O-ring (253*b*) for the flow path (25*e*). The seal retaining portion (253*c*) and the nozzle main body (252**) are joined in a socket-and-spigot joint fashion.

6 Claims, 19 Drawing Sheets

COLD SPRAY NOZZLE AND COLD SPRAY DEVICE

TECHNICAL FIELD

The present invention relates to a nozzle for cold spray and a cold spray apparatus.

BACKGROUND ART

A cold spray apparatus is known, which sprays metal particles onto a base material to form a metal film by plastic deformation of the metal particles. A nozzle for cold spray including a tubular nozzle main body and a cooling member capable of cooling the nozzle main body is also known as the nozzle used for the cold spray apparatus to spray the metal particles (see Patent Document 1, for example).

This nozzle for cold spray cools the inner surface of the nozzle body main by cooling the outer surface of the nozzle main body, which is made of a heat conductive material, with a fluid circulated in the cooling member. This suppresses the adhesion of metal particles in the nozzle main body and prevents the nozzle main body from being blocked due to the adhesion and deposition of the metal particles.

PRIOR ART DOCUMENT

Patent Document

[Patent Document 1] JP2009-000632A

SUMMARY OF INVENTION

Problems to be solved by Invention

Unfortunately, however, the above nozzle for cold spray has a problem that the fluid used as a refrigerant leaks from the cooling member. For example, when water is used as the fluid and the water leaks from the nozzle for cold spray and adheres to the metal film, this causes poor quality, poor interfacial adhesion, and the like of the metal film. This fluid leakage occurs due to a gap being created in the seal for a passage through which the fluid flows, such as by the vibration of the nozzle main body in association with the spray of metal particles or the misalignment of the nozzle main body due to movement and stop of movement of the nozzle for cold spray.

A problem to be solved by the present invention is to provide a nozzle for cold spray and a cold spray apparatus that are able to prevent the leakage of refrigerant, such as due to the vibration or misalignment of the nozzle main body.

Means for Solving Problems

The present invention solves the above problem through configuring a nozzle for cold spray so as to include a tubular nozzle main body and a cooling jacket that surrounds the nozzle main body to form a flow path for a refrigerant, providing the cooling jacket with a seal retaining portion that retains a seal member for the flow path, and joining the seal retaining portion with the nozzle main body in a socket-and-spigot joint fashion.

Effect of Invention

According to the present invention, the socket-and-spigot joint between the nozzle main body and the cooling jacket can suppress the vibration, misalignment, and the like of the nozzle main body, thus preventing the leakage of the refrigerant.

MODE(S) FOR CARRYING OUT THE INVENTION

Figure 1:
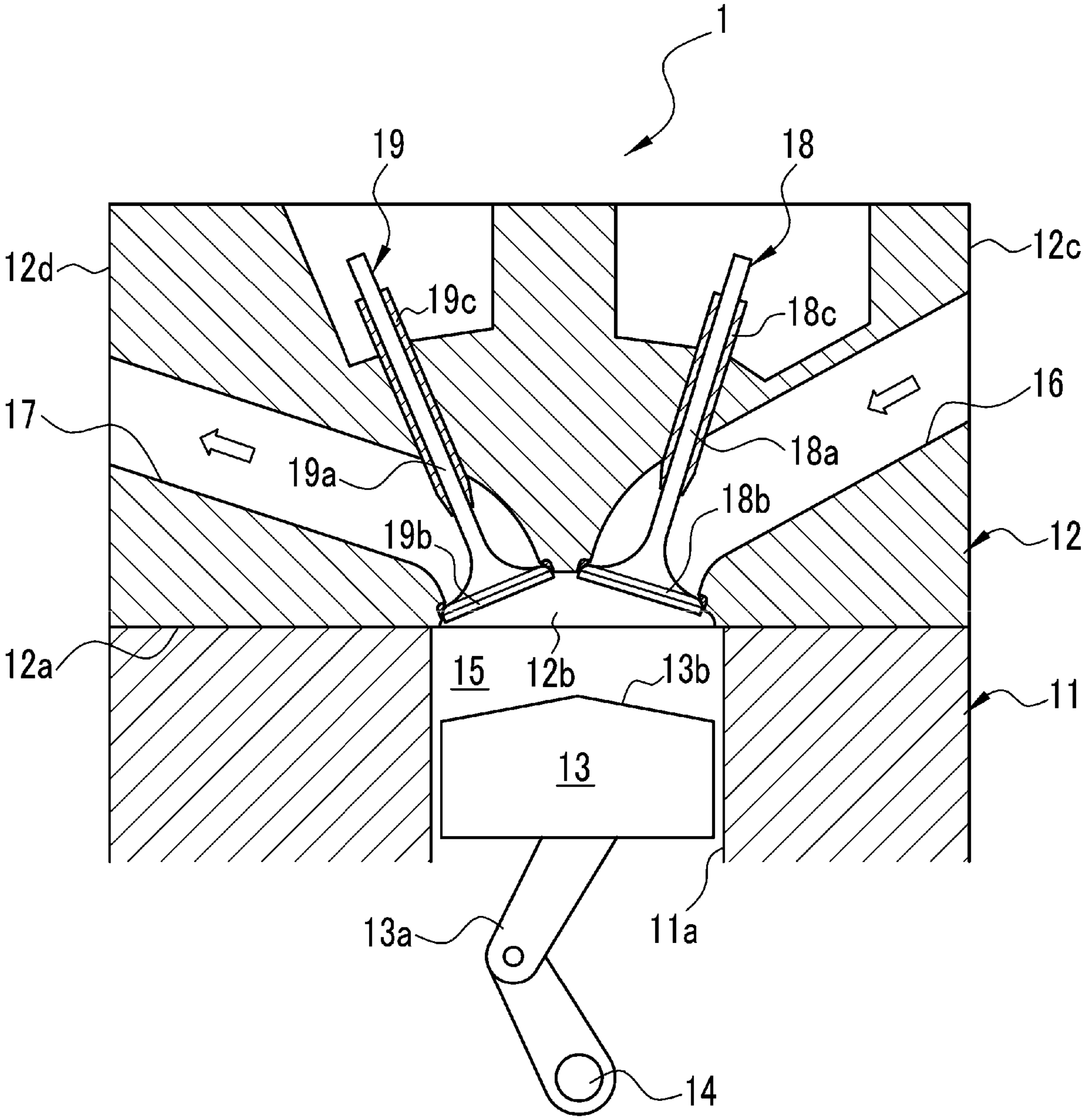
FIG. 1 is a cross-sectional view of an internal-combustion engine including a cylinder head in which valve seat films are formed using the cold spray apparatus and the nozzle for cold spray according to one or more embodiments of the present invention.

Hereinafter, one or more embodiments of the present invention will be described with reference to the drawings. First, an internal-combustion engine 1 will be described, which includes valve seat films formed using the nozzle for cold spray and the cold spray apparatus according to one or more embodiments of the present invention. FIG. 1 is a cross-sectional view of the internal-combustion engine 1 and mainly illustrates the configuration around the cylinder head.

The internal-combustion engine 1 includes a cylinder block 11 and a cylinder head 12 that is mounted on the upper portion of the cylinder block 11. The internal-combustion engine 1 is, for example, a four-cylinder gasoline engine, and the cylinder block 11 has four cylinders 11*a* arranged in the depth direction of the drawing sheet. The cylinders 11*a* house respective pistons 13 that reciprocate in the vertical direction in the figure. Each piston 13 is connected to a crankshaft 14, which extends in the depth direction of the drawing sheet, via a connecting rod 13*a*.

The cylinder head 12 has a mounting surface 12*a* for being mounted to the cylinder block 11. The mounting surface 12*a* is provided with four recesses 12*b* at positions corresponding to respective cylinders 11*a*. The recesses 12*b* define combustion chambers 15 of the cylinders. Each combustion chamber 15 is a space for combusting a mixture gas of fuel and intake air and is defined by a recess 12*b* of the cylinder head 12, a top surface 13*b* of the piston 13, and an inner circumferential surface of the cylinder 11*a*.

The cylinder head 12 includes ports for intake (referred to as intake ports, hereinafter) 16 that connect between the combustion chambers 15 and one side surface 12*c* of the cylinder head 12. The intake ports 16 have a curved, approximately cylindrical shape and supply intake air from an intake manifold (not illustrated) connected to the side surface 12*c* into respective combustion chambers 15.

The cylinder head 12 further includes ports for exhaust (referred to as exhaust ports, hereinafter) 17 that connect between the combustion chambers 15 and the other side surface 12*d* of the cylinder head 12. The exhaust ports 17 have a curved, approximately cylindrical shape like the intake ports 16 and exhaust the exhaust gas generated by the combustion of the mixture gas in respective combustion chambers 15 to an exhaust manifold (not illustrated) connected to the side surface 12*d*. In the internal-combustion engine 1 according to one or more embodiments of the present invention, one cylinder 11*a* is provided with two intake ports 16 and two exhaust ports 17.

The cylinder head 12 is provided with intake valves 18 that open and close the intake ports 16 with respect to the combustion chambers 15 and exhaust valves 19 that open and close the exhaust ports 17 with respect to the combustion chambers 15. Each intake valve 18 includes a round rod-shaped valve stem 18*a* and a disk-shaped valve head 18*b* that is provided at the tip of the valve stem 18*a*. Likewise, each exhaust valve 19 includes a round rod-shaped valve stem 19*a* and a disk-shaped valve head 19*b* that is provided at the tip of the valve stem 19*a*. The valve stems 18*a* and 19*a* are slidably inserted into approximately cylindrical valve guides 18*c* and 19*c*, respectively. This allows the intake valves 18 and the exhaust valves 19 to be movable with respect to the combustion chambers 15 along the axial directions of the valve stems 18*a* and 19*a*.

Figure 2:
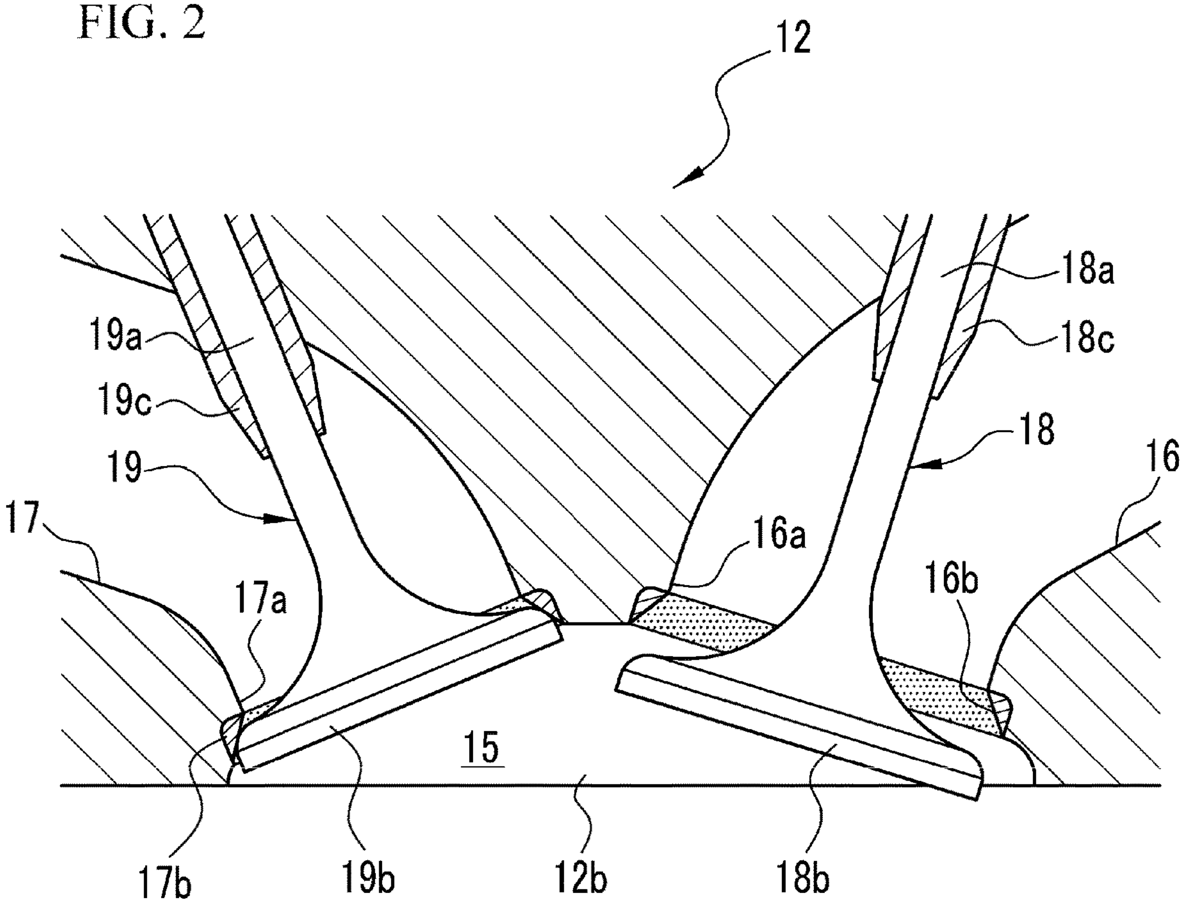
FIG. 2 is a cross-sectional view of the periphery of valves of the internal-combustion engine including the cylinder head in which the valve seat films are formed using the cold spray apparatus and the nozzle for cold spray according to one or more embodiments of the present invention.

FIG. 2 is an enlarged view illustrating a portion in which a combustion chamber 15 communicates with an intake port 16 and an exhaust port 17. The intake port 16 includes an approximately circular opening portion 16*a* at the portion communicating with the combustion chamber 15. The opening portion 16*a* has an annular edge portion provided with an annular valve seat film 16*b* that abuts against the valve head 18*b* of an intake valve 18. When the intake valve 18 moves upward along the axial direction of the valve stem 18*a*, the upper surface of the valve head 18*b* comes into contact with the valve seat film 16*b* to close the intake port 16. When the intake valve 18 moves downward along the axial direction of the valve stem 18*a*, a gap is formed between the upper surface of the valve head 18*b* and the valve seat film 16*b* to open the intake port 16.

Like the intake port 16, the exhaust port 17 includes an approximately circular opening portion 17*a* at the portion communicating with the combustion chamber 15, and the opening portion 17*a* has an annular edge portion provided with an annular valve seat film 17*b* that abuts against the valve head 19*b* of an exhaust valve 19. When the exhaust valve 19 moves upward along the axial direction of the valve stem 19*a*, the upper surface of the valve head 19*b* comes into contact with the valve seat film 17*b* to close the exhaust port 17. When the exhaust valve 19 moves downward along the axial direction of the valve stem 19*a*, a gap is formed between the upper surface of the valve head 19*b* and the valve seat film 17*b* to open the exhaust port 17.

In the four-cycle internal-combustion engine 1, for example, only the intake valve 18 opens when the corresponding piston 13 moves down, and the mixture gas is introduced from the intake port 16 into the cylinder 11*a*. Subsequently, in a state in which the intake valve 18 and the exhaust valve 19 are closed, the piston 13 moves up to compress the mixture gas in the cylinder 11*a*, and when the piston 13 approximately reaches the top dead center, the mixture gas is ignited to explode by a spark plug, which is not illustrated. This explosion makes the piston 13 move down to the bottom dead center and is converted into the rotational force via the connected crankshaft 14. When the piston 13 reaches the bottom dead center and starts moving up again, only the exhaust valve 19 is opened to exhaust the exhaust gas in the cylinder 11*a* to the exhaust port 17. The internal-combustion engine 1 repeats the above cycle to generate the output.

The opening portions 16*a* and 17*a* of the cylinder head 12 have respective annular edge portions, and the valve seat films 16*b* and 17*b* are formed directly on the annular edge portions using a cold spray method. The cold spray method refers to a method that includes making a supersonic flow of an operation gas having a temperature lower than the melting point or softening point of a raw material powder, injecting the raw material powder carried by a carrier gas into the operation gas to spray the raw material powder from a nozzle tip, and causing the raw material powder in the solid phase state to collide with a base material to form a metal film by plastic deformation of the raw material powder. Compared with a thermal spray method in which the material is melted and deposited on a base material, the cold spray method has features that a dense film can be obtained without oxidation in the air, thermal alteration is suppressed because of less thermal effect on the material particles, the film formation speed is high, the film can be made thick, and the deposition efficiency is high. In particular, the cold spray method is suitable for use for structural materials such as the valve seat films 16*b* and 17*b* of the internal-combustion engine 1 because the film formation speed is high and the films can be made thick.

Figure 3:
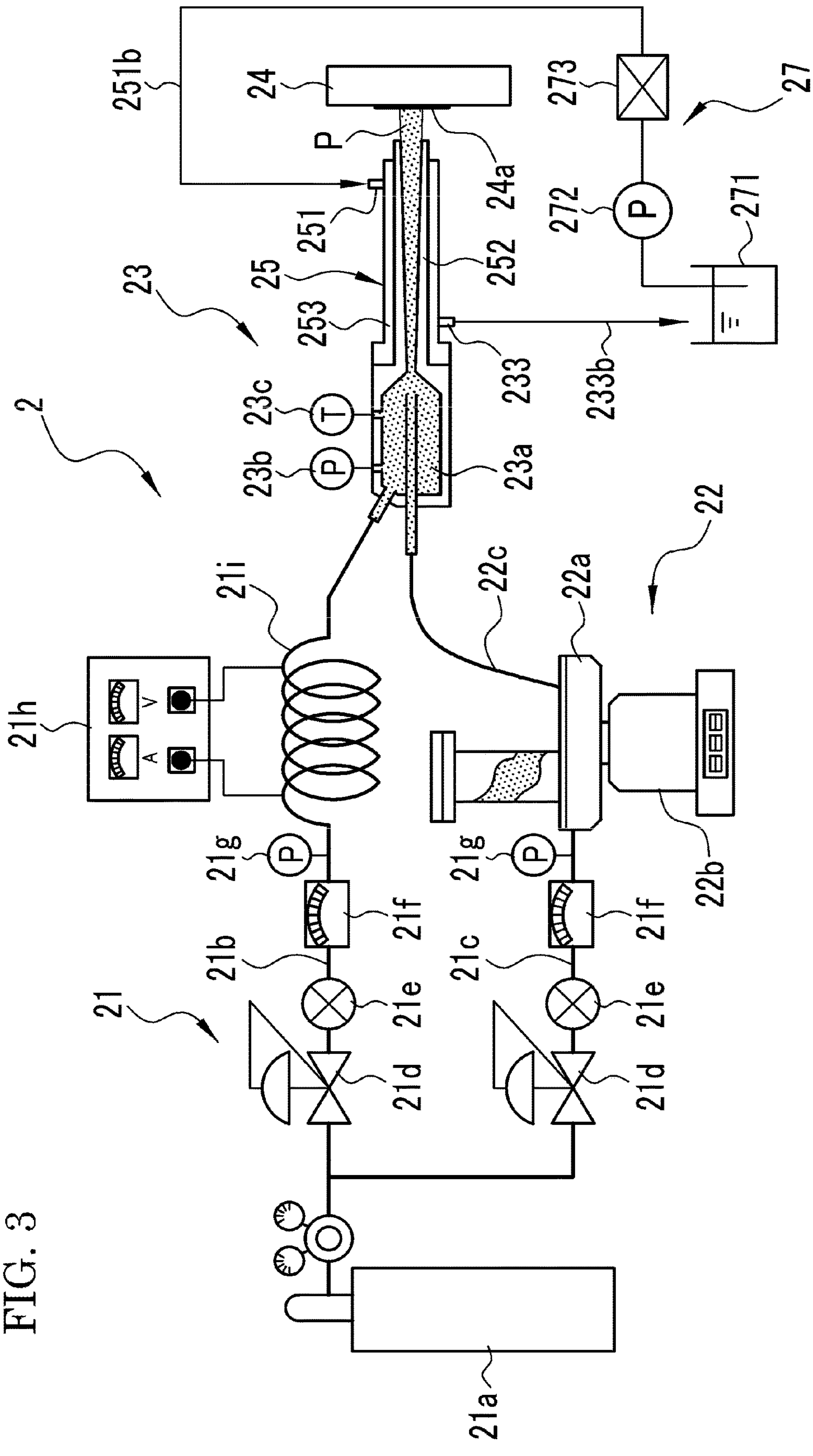
FIG. 3 is a schematic view illustrating the configuration of the cold spray apparatus according to one or more embodiments of the present invention.

FIG. 3 illustrates the schematic configuration of a cold spray apparatus 2 according to one or more embodiments of the present invention. The cold spray apparatus 2 is used for the formation of the above valve seat films 16*b* and 17*b*. Conventional cold spray apparatuses are used for repair and the like of metal mechanical components and structural components and are thus often used for film formation on a relatively large area. On the other hand, the cold spray apparatus 2 according to one or more embodiments of the present invention is applied to film formation on a site having a relatively small area, such as the valve seat films 16*b* and 17*b* of the cylinder head 12, and therefore includes a nozzle for cold spray that is reduced in size than those of the conventional cold spray apparatuses.

The cold spray apparatus 2 according to one or more embodiments of the present invention includes a gas supply unit 21 that supplies an operation gas and a carrier gas, a raw material powder supply unit 22 that supplies a raw material powder of the valve seat films 16*b* and 17*b*, and a cold spray gun 23 that sprays the raw material powder as a supersonic flow using the operation gas having a temperature equal to or lower than the melting point of the raw material powder. The gas supply unit 21, the raw material powder supply unit 22, and the cold spray gun 23 correspond to the gas supply means, the raw material powder supply means, and the spray means according to the present invention.

The gas supply unit 21 includes a compressed gas cylinder 21*a*, an operation gas line 21*b*, and a carrier gas line 21*c*. Each of the operation gas line 21*b* and the carrier gas line 21*c* includes a pressure regulator 21*d*, a flow rate control valve 21*e*, a flow meter 21*f*, and a pressure gauge 21*g*. The pressure regulators 21*d*, the flow rate control valves 21*e*, the flow meters 21*f*, and the pressure gauges 21*g* are used for adjusting the pressure and flow rate of the operation gas and carrier gas from the compressed gas cylinder 21*a*.

The operation gas line 21*b* is installed with a heater 21*i* heated by a power source 21*h*. The operation gas is heated by the heater 21*i* to a temperature lower than the melting point or softening point of the raw material powder and then introduced into a chamber 23*a* of the cold spray gun 23. The chamber 23*a* is installed with a pressure gauge 23*b* and a thermometer 23*c*, which are used for feedback control of the pressure and temperature.

On the other hand, the raw material powder supply unit 22 includes a raw material powder supply device 22*a*, which is provided with a weighing machine 22*b* and a raw material powder supply line 22*c*. The carrier gas from the compressed gas cylinder 21*a* is introduced into the raw material powder supply device 22*a* through the carrier gas line 21*c*. A predetermined amount of the raw material powder weighed by the weighing machine 22*b* is carried into the chamber 23*a* via the raw material powder supply line 22*c*.

The cold spray gun 23 includes a nozzle for cold spray 25 according to one or more embodiments of the present invention at the tip portion of the cold spray gun 23. The cold spray gun 23 sprays the raw material powder P, which is carried into the chamber 23*a* by the carrier gas, together with the operation gas as the supersonic flow from the tip of the nozzle for cold spray 25 and causes the raw material powder P in the solid phase state or solid-liquid coexisting state to collide with a base material 24 to form a film 24*a*. In one or more embodiments of the present invention, the cylinder head 12 is applied as the base material 24, and the raw material powder P is sprayed onto the annular edge portions of the opening portions 16*a* and 17*a* of the cylinder head 12 using the cold spray method to form the valve seat films 16*b* and 17*b*.

The valve seats of the cylinder head 12 are required to have high heat resistance and wear resistance to withstand the impact input from the valves in the combustion chambers 15 and high heat conductivity for cooling the combustion chambers 15. In response to these requirements, according to the valve seat films 16*b* and 17*b* formed of the powder of precipitation-hardened copper alloy, for example, the valve seats can be obtained which are excellent in the heat resistance and wear resistance and harder than the cylinder head 12 formed of an aluminum alloy for casting.

Moreover, the valve seat films 16*b* and 17*b* are formed directly on the cylinder head 12, and higher heat conductivity can therefore be obtained as compared with conventional valve seats formed by press-fitting seat rings as separate components into the port opening portions. Furthermore, as compared with the case in which the seat rings as separate components are used, subsidiary effects can be obtained such as that the valve seats can be made close to a water jacket for cooling and the tumble flow can be promoted due to expansion of the throat diameter of the intake ports 16 and exhaust ports 17 and optimization of the port shape.

The raw material powder P used for forming the valve seat films 16*b* and 17*b* is preferably a powder of metal that is harder than an aluminum alloy for casting and with which the heat resistance, wear resistance, and heat conductivity required for the valve seats can be obtained. For example, it is preferred to use the above-described precipitation-hardened copper alloy. The precipitation-hardened copper alloy for use may be a Corson alloy that contains nickel and silicon, chromium copper that contains chromium, zirconium copper that contains zirconium, or the like. It is also possible to apply, for example, a precipitation-hardened copper alloy that contains nickel, silicon, and chromium, a precipitation-hardened copper alloy that contains nickel, silicon, and zirconium, a precipitation-hardened copper alloy that contains nickel, silicon, chromium, and zirconium, a precipitation-hardened copper alloy that contains chromium and zirconium, or the like.

The valve seat films 16*b* and 17*b* may also be formed by mixing a plurality of types of raw material powders; for example, a first raw material powder and a second raw material powder. In this case, it is preferred to use, as the first raw material powder, a powder of metal that is harder than an aluminum alloy for casting and with which the heat resistance, wear resistance, and heat conductivity required for valve seats can be obtained. For example, it is preferred to use the above-described precipitation-hardened copper alloy. On the other hand, it is preferred to use, as the second raw material powder, a powder of metal that is harder than the first raw material powder. The second raw material powder for application may be an alloy such as an iron-based alloy, a cobalt-based alloy, a chromium-based alloy, a nickel-based alloy, or a molybdenum-based alloy, ceramics, or the like. One type of these metals may be used alone, or two or more types may also be used in combination.

With the valve seat films formed of a mixture of the first raw material powder and the second raw material powder which is harder than the first raw material powder, more excellent heat resistance and wear resistance can be obtained than those of valve seat films formed only of a precipitation-hardened copper alloy. The reason that such an effect is obtained appears to be because the second raw material powder allows the oxide film existing on the surface of the cylinder head 12 to be removed so that a new interface is exposed and formed to improve the interfacial adhesion between the cylinder head 12 and the metal films. Additionally or alternatively, it appears that the anchor effect due to the second raw material powder sinking into the cylinder head 12 improves the interfacial adhesion between the cylinder head 12 and the metal films. Additionally or alternatively, it appears that when the first raw material powder collides with the second raw material powder, a part of the kinetic energy is converted into heat energy, or heat is generated in the process in which a part of the first raw material powder is plastically deformed, and such heat promotes the precipitation hardening in a part of the precipitation-hardened copper alloy used as the first raw material powder.

FIRST EMBODIMENT

The nozzle for cold spray 25 according to a first embodiment of the present invention will then be described. In a conventional cold spray apparatus, when the spray of the raw material powder is continued for several minutes or more, for example, the raw material powder may adhere and deposit in the nozzle for cold spray to block the inside of the nozzle for cold spray. Moreover, in the conventional cold spray apparatus, the deposited material of the raw material powder removed from the inside of the nozzle for cold spray may be sprayed by the operation gas to form a part of the film. The deposited material of the raw material powder has a very porous structure, and the formed film therefore has a non-uniform structure.

The reason that the raw material powder adheres inside the nozzle for cold spray is because the raw material powder collides with the inner surface of the nozzle for cold spray at high speed thereby to plastically deform the raw material powder and the nozzle for cold spray, thus breaking the oxide films of the raw material powder and the nozzle for cold spray, and the newly-formed surfaces of the raw material powder and the nozzle for cold spray come into contact with each other to form metal bond. Accordingly, in a small nozzle for cold spray used for forming a film on a site having a relatively small area, such as the above-described valve seat films 16*b* and 17*b*, the ratio of the wall surface to the nozzle internal area is relatively large, and the friction between the nozzle and the raw material powder is relatively remarkable, which increases the nozzle temperature. Such an increased temperature of the nozzle causes its plastic deformation to readily occur due to collision with the raw material powder, and the adhesion and deposition of the raw material powder take place more remarkably. Moreover, the flow rate of the raw material powder rises to a supersonic speed in the nozzle for cold spray, and the adhesion of the raw material powder therefore becomes remarkable at the nozzle tip portion at which the flow rate is the fastest.

The nozzle for cold spray 25 of the present embodiment is made smaller than the conventional cold spray apparatus in order to be applied to the film formation on a site having a relatively small area. To prevent the adhesion and deposition of the raw material powder P, the nozzle for cold spray 25 has a function of cooling the nozzle for cold spray 25. By cooling the nozzle for cold spray 25, the temperature inside the nozzle for cold spray 25 is lowered as compared with the temperature before cooling; therefore, even when the raw material powder P collides with the nozzle for cold spray 25, a sufficient amount of plastic deformation for adhesion is not obtained, and the raw material powder P is less likely to adhere.

Figure 4:
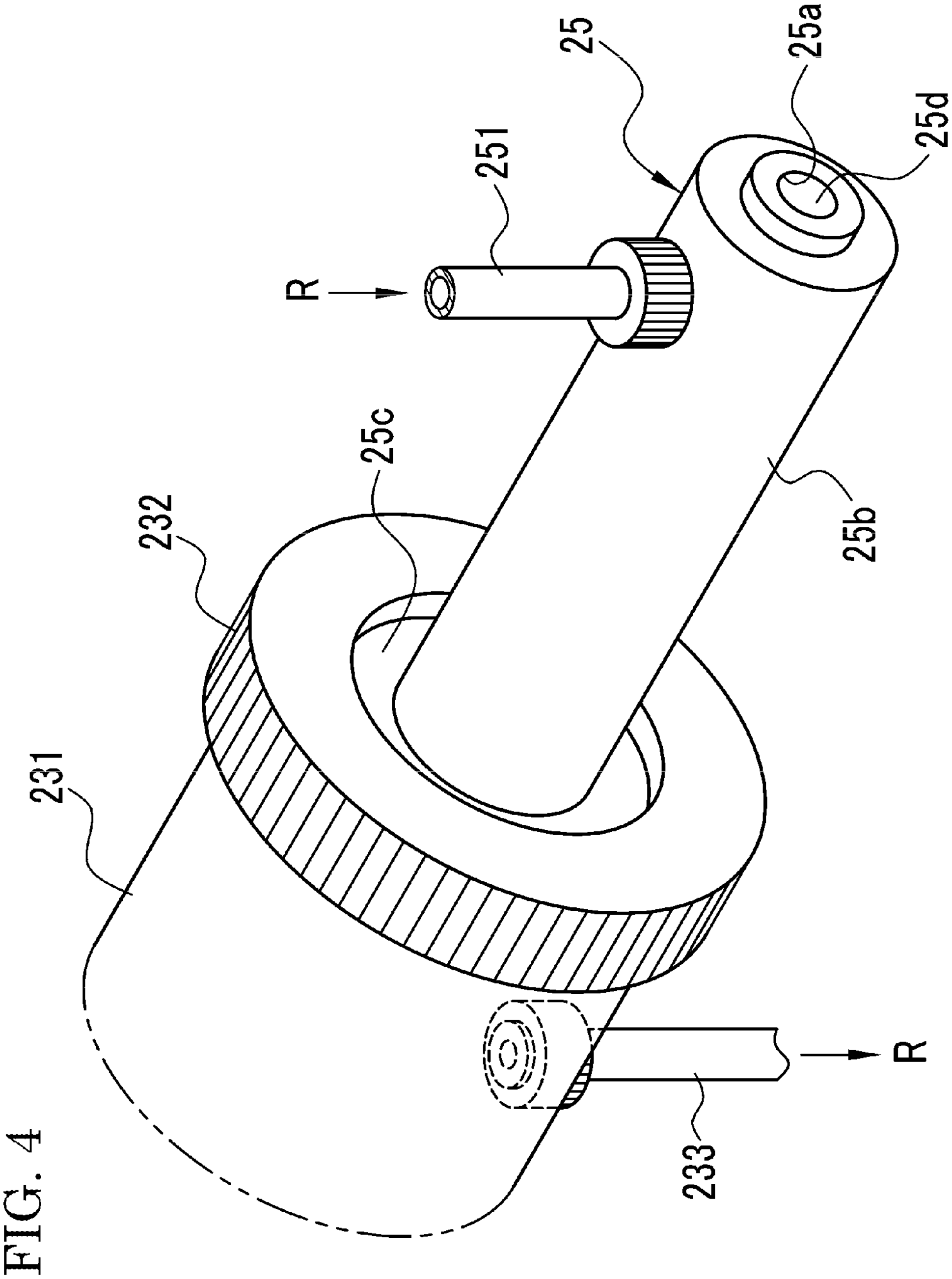
FIG. 4 is a perspective view illustrating the nozzle for cold spray according to a first embodiment of the present invention.

FIG. 4 is a perspective view illustrating a state in which the nozzle for cold spray 25 of the present embodiment is attached to a nozzle attaching portion 231 of the cold spray gun 23. The nozzle attaching portion 231 has a cylindrical shape and holds the nozzle for cold spray 25 on the tip side of the nozzle attaching portion 231. The nozzle attaching portion 231 corresponds to the main body portion of the cold spray apparatus in the present invention. A nozzle fixing ring 232 is attached on the tip side of the nozzle attaching portion 231 to fix the nozzle for cold spray 25 to the nozzle attaching portion 231. The nozzle attaching portion 231 connects the nozzle for cold spray 25 and the chamber 23*a* of the cold spray gun 23. Thus, the cold spray gun 23 supplies the raw material powder P and the operation gas in the chamber 23*a* to the nozzle for cold spray 25 through the nozzle attaching portion 231 and sprays the raw material powder P and the operation gas from a spray port 25*a* provided at the tip of the nozzle for cold spray 25.

The nozzle for cold spray 25 includes a spray portion 25*b* and a base portion 25*c*. The spray portion 25*b* has the spray port 25*a* for the raw material powder P at the tip of the spray portion 25*b*. The base portion 25*c* is attached to the nozzle attaching portion 231. The spray portion 25*b* has a cylindrical shape and projects from the tip side of the nozzle attaching portion 231. A spray passage 25*d* is provided in the spray portion 25*b* to accelerate the raw material powder P, which is supplied from the chamber 23*a*, together with the operation gas to a supersonic flow. The spray port 25*a* is provided at the end of the spray passage 25*d*. To spray the raw material powder P to a site having a relatively small area, such as the valve seat films 16*b* and 17*b*, the spray portion 25*b* is made to have a smaller diameter than that of the conventional nozzle for cold spray. The base portion 25*c* is in a cylindrical shape having a larger diameter than that of the spray portion 25*b* and is attached to the nozzle attaching portion 231. The nozzle fixing ring 232 fixes the base portion 25*c* so that the nozzle for cold spray 25 does not drop off from the nozzle attaching portion 231.

The nozzle for cold spray 25 includes a flow path 25*e* (see FIG. 7) through which a refrigerant (for example, water) R flows. The nozzle for cold spray 25 includes a refrigerant introduction part 251 at the upper portion of the spray portion 25*b* on the tip side. The refrigerant introduction part 251 introduces the refrigerant R into the flow path 25*e*. Furthermore, the lower portion of the nozzle attaching portion 231 is provided with a refrigerant discharge part 233 that discharges the refrigerant R in the flow path 25*e*. The nozzle for cold spray 25 cools the spray passage 25*d* of the nozzle for cold spray 25 through introducing the refrigerant R from the refrigerant introduction part 251 into the flow path 25*e*, allowing the refrigerant R to flow in the flow path 25*e*, and discharging the refrigerant R from the flow path 25*e* via the refrigerant discharge part 233.

Figure 5:
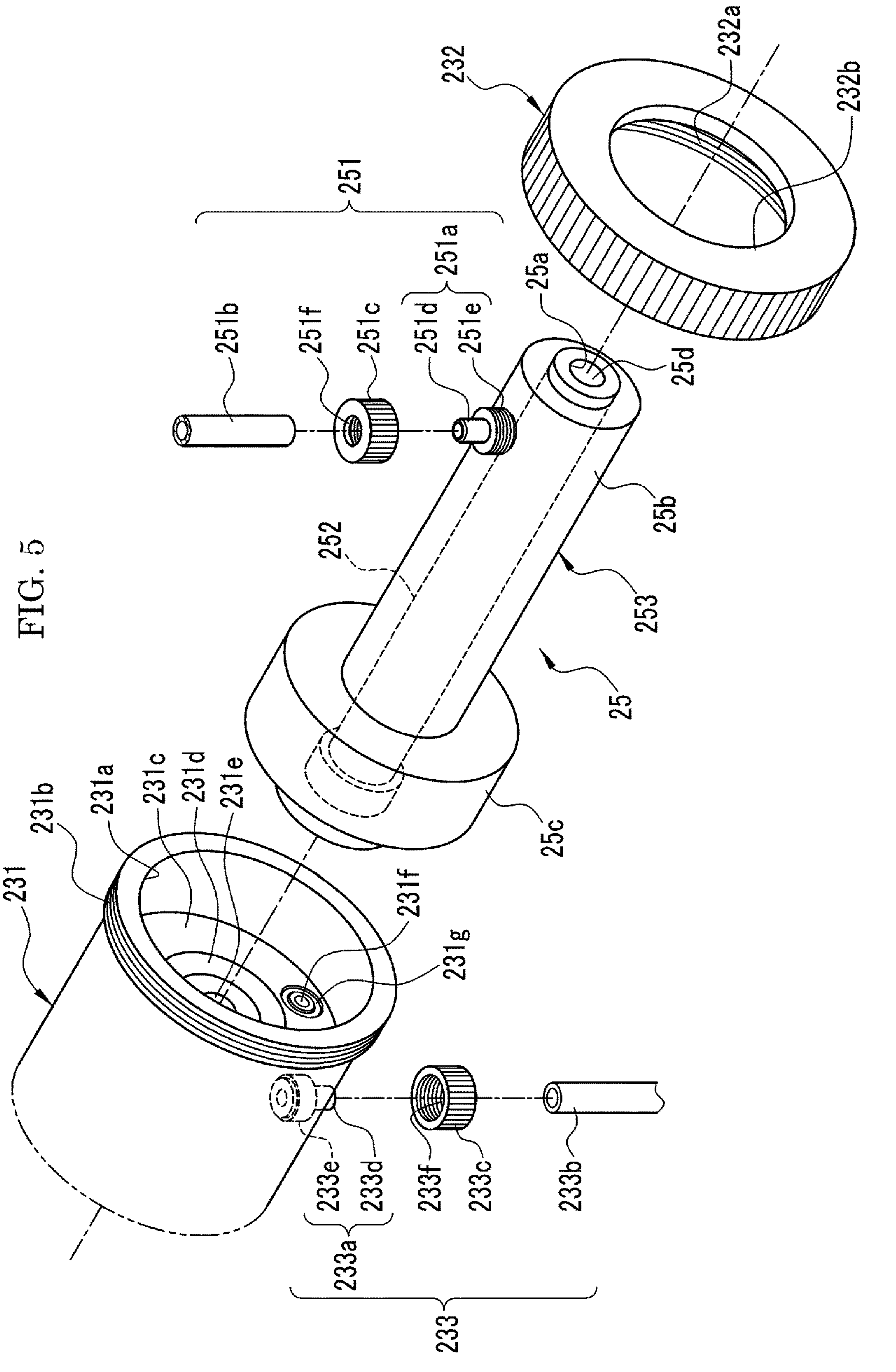
FIG. 5 is a perspective view illustrating a state in which the nozzle for cold spray according to the first embodiment of the present invention is detached from a cold spray gun.

FIG. 5 is a perspective view illustrating a state in which the nozzle for cold spray 25 is detached from the nozzle attaching portion 231 of the cold spray gun 23. A recessed nozzle accommodating portion 231*a* is provided on the tip side of the nozzle attaching portion 231. The base portion 25*c* of the nozzle for cold spray 25 is inserted into the nozzle accommodating portion 231*a*. The outer peripheral surface of the nozzle attaching portion 231 on its tip side is provided with a threaded portion 231*b* to which the nozzle fixing ring 232 is attached.

The nozzle attaching portion 231 includes a cylindrical nozzle connecting portion 231*d* at a bottom surface portion 231*c* of the nozzle accommodating portion 231*a* on the rear end side. The nozzle connecting portion 231*d* is connected to the nozzle for cold spray 25. The central portion of the nozzle connecting portion 231*d* is provided with a chamber connecting path 231*e* that connects the chamber 23*a* of the cold spray gun 23 and the nozzle for cold spray 25.

A discharge path 231*f* is provided below the nozzle connecting portion 231*d* to connect the flow path 25*e* of the nozzle for cold spray 25 and the refrigerant discharge part 233. An O-ring 231*g* is incorporated in the outer periphery of the discharge path 231*f* to seal the connection portion between the flow path 25*e* of the nozzle for cold spray 25 and the discharge path 231*f*.

The nozzle fixing ring 232 has a cylindrical shape and includes a nut portion 232*a* on the inner surface. The nut portion 232*a* is screwed with the threaded portion 231*b* of the nozzle attaching portion 231. A nozzle pressing portion 232*b* is provided on the tip side of the nozzle fixing ring 232. The nozzle pressing portion 232*b* is provided with a hole into which the spray portion 25*b* of the nozzle for cold spray 25 is inserted. When the nozzle fixing ring 232 is attached to the nozzle attaching portion 231, the nozzle pressing portion 232*b* presses the base portion 25*c* of the nozzle for cold spray 25, and the rear end portion of the nozzle for cold spray 25 is pressed against the bottom surface portion 231*c* of the nozzle accommodating portion 231*a*. This allows the spray passage 25*d* and the chamber connecting path 231*e* to be connected without a gap and also allows the flow path 25*e* and the discharge path 231*f* to be connected without a gap.

The refrigerant introduction part 251, which introduces the refrigerant R into the flow path 25*e* of the nozzle for cold spray 25, includes an introduction pipe connecting portion 251*a* provided on the spray portion 25*b* of the nozzle for cold spray 25, an introduction pipe 251*b* connected to the introduction pipe connecting portion 251*a*, and a fixing nut 251*c* that fixes the introduction pipe 251*b* to the introduction pipe connecting portion 251*a*. The introduction pipe connecting portion 251*a* includes a cylindrical pipe insertion part 251*d* inserted into the introduction pipe 251*b*, which is made of a steel pipe, a hose, or the like, and a fixing screw 251*e* provided below the pipe insertion part 251*d*. The inner diameter portion of the pipe insertion part 251*d* penetrates into the nozzle for cold spray 25 and is connected to the flow path 25*e*. The fixing nut 251*c* is screwed with the fixing screw 251*e* of the introduction pipe connecting portion 251*a*, and the outer periphery of the introduction pipe 251*b*, into which the pipe insertion part 251*d* is inserted, is pressed and fixed by a pipe insertion hole 251*f*. The introduction pipe 251*b* is connected to a refrigerant circulation circuit 27 (see FIG. 3) that circulates the refrigerant R between the refrigerant introduction part 251 and the refrigerant discharge part 233, and the refrigerant R is introduced into the introduction pipe 251*b* from the refrigerant circulation circuit 27.

The refrigerant discharge part 233, which discharges the refrigerant R from the flow path 25*e* of the nozzle for cold spray 25, includes a discharge pipe connecting portion 233*a* provided on the nozzle attaching portion 231, a discharge pipe 233*b* connected to the discharge pipe connecting portion 233*a*, and a fixing nut 233*c* that fixes the discharge pipe 233*b* to the discharge pipe connecting portion 233*a*. The discharge pipe connecting portion 233*a* includes a cylindrical pipe insertion part 233*d* inserted into the discharge pipe 233*b*, which is made of a steel pipe, a hose, or the like, and a fixing screw 233*e* provided above the pipe insertion part 233*d*. The inner diameter portion of the pipe insertion part 233*d* is connected to the discharge path 231*f* arranged in the bottom surface portion 231*c* of the nozzle attaching portion 231. The fixing nut 233*c* is screwed with the fixing screw 233*e* of the discharge pipe connecting portion 233*a*, and the outer periphery of the discharge pipe 233*b*, into which the pipe insertion part 233*d* is inserted, is pressed and fixed by a pipe insertion hole 233*f*. The discharge pipe 233*b* is connected to the refrigerant circulation circuit 27, and the refrigerant R is discharged from the discharge pipe 233*b* to the refrigerant circulation circuit 27.

Figure 6:
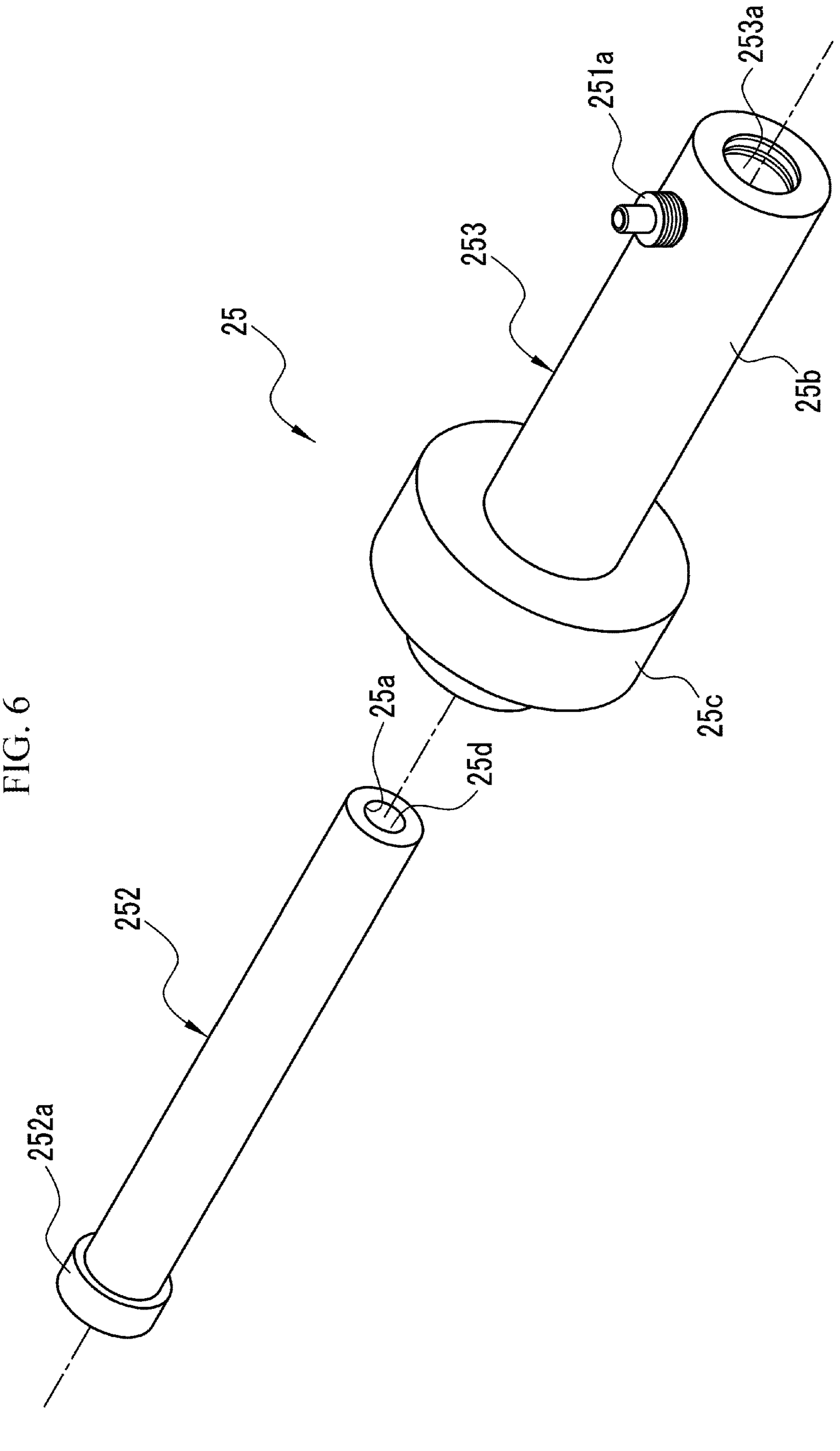
FIG. 6 is an exploded perspective view illustrating the configuration of the nozzle for cold spray according to the first embodiment of the present invention.

FIG. 6 is an exploded perspective view illustrating the configuration of the nozzle for cold spray 25. The nozzle for cold spray 25 includes a nozzle main body 252 having the spray port 25*a* and the spray passage 25*d* and a cooling jacket 253 having the spray portion 25*b* and the base portion 25*c*. The nozzle main body 252 is inserted into the cooling jacket 253 from the rear end side of the cooling jacket 253, and the tip portion having the spray port 25*a* protrudes from the tip of the cooling jacket 253.

The nozzle main body 252 has an elongated cylindrical shape and includes the spray passage 25*d* inside. The nozzle main body 252 includes a connecting portion 252*a* at the rear end portion on the opposite side to the spray port 25*a*. The connecting portion 252*a* has a diameter larger than that of the other portions. When the nozzle main body 252 is inserted into the cooling jacket 253, the connecting portion 252*a* defines the position of the nozzle main body 252 in the cooling jacket 253. When the nozzle for cold spray 25 is attached to the nozzle attaching portion 231, the nozzle main body 252 is supported so that the connecting portion 252*a* is interposed between the cooling jacket 253 and the nozzle attaching portion 231. The connecting portion 252*a* of the nozzle main body 252 comes into contact with the nozzle connecting portion 231*d* thereby to connect the spray passage 25*d* and the chamber connecting path 231*e*. The nozzle main body 252 is made of a material having heat conductivity; for example, a metal such as stainless steel. This allows the inner spray passage 25*d* to be cooled by cooling the outer peripheral surface of the nozzle main body 252 with the refrigerant R.

The cooling jacket 253 includes the introduction pipe connecting portion 251*a* at the upper portion of the spray portion 25*b* on the tip side. The cooling jacket 253 also includes an inner diameter portion 253*a* into which the nozzle main body 252 can be inserted. The cooling jacket 253 surrounds the nozzle main body 252, which is inserted from the rear end side, to form the flow path 25*e* for the refrigerant R between the cooling jacket 253 and the outer peripheral surface of the nozzle main body 252.

Figure 7:
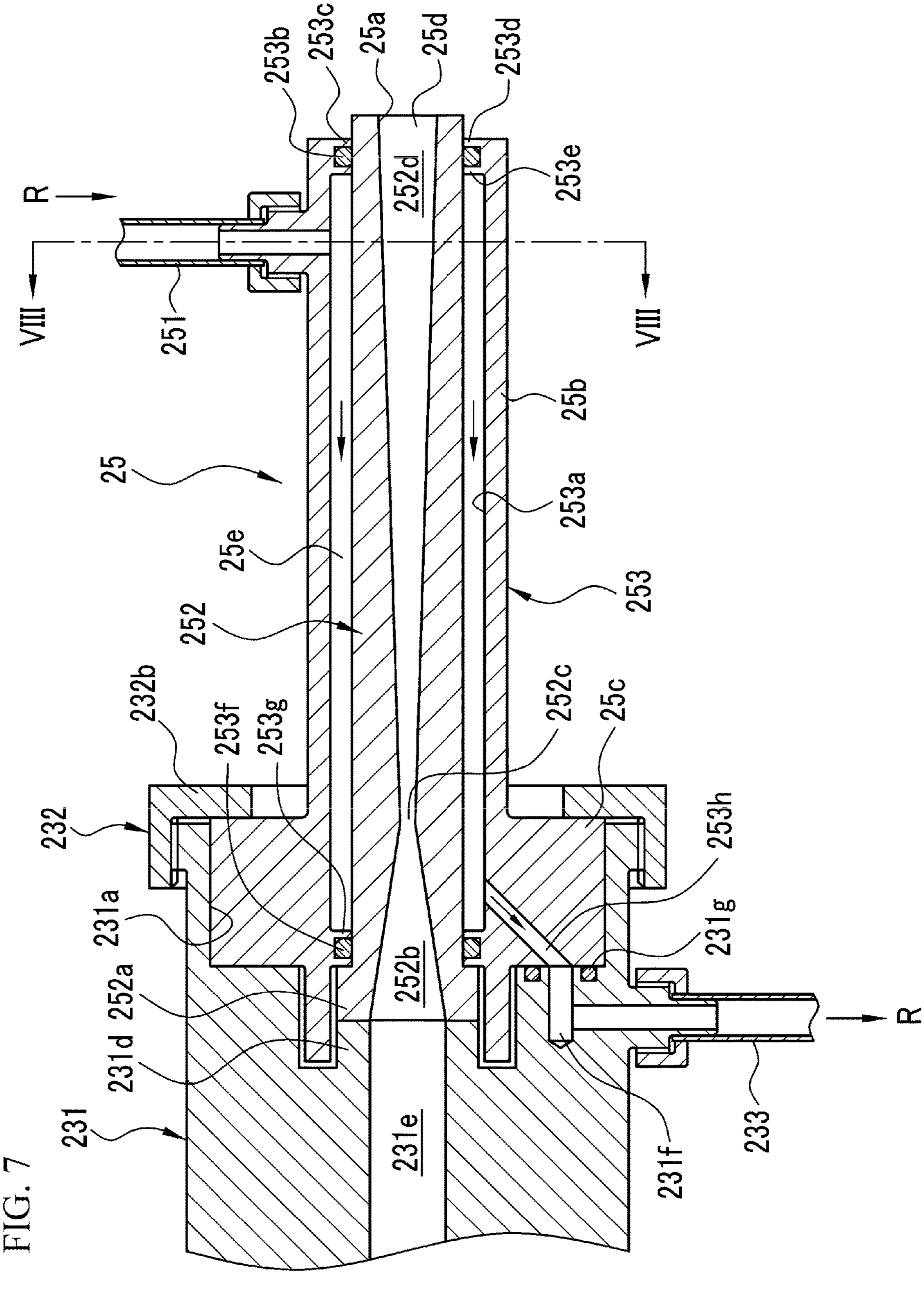
FIG. 7 is a cross-sectional view in which the nozzle for cold spray according to the first embodiment of the present invention is cut along the spraying direction of a raw material powder.

FIG. 7 is a cross-sectional view in which the nozzle for cold spray 25 attached to the nozzle attaching portion 231 of the cold spray gun 23 is cut along the spraying direction of the raw material powder P. The spray passage 25*d* of the nozzle main body 252 is provided with a convergent portion 252*b*, a throat portion 252*c*, and a divergent portion 252*d* in this order from the rear end side. The convergent portion 252*b* is a conical passage whose cross-sectional area is gradually reduced toward the tip. The divergent portion 252*d* is a conical passage whose cross-sectional area is gradually increased toward the tip. The throat portion 252*c* is a connecting portion between the convergent portion 252*b* and the divergent portion 252*d* and has the smallest cross-sectional area in the nozzle main body 252. The nozzle main body 252 sprays the raw material powder P as a supersonic flow from the spray port 25*a* through compressing the operation gas, which is supplied together with the raw material powder P from the chamber 23*a*, in the convergent portion 252*b* and releasing the pressure of the operation gas in the divergent portion 252*d*.

Figure 8:
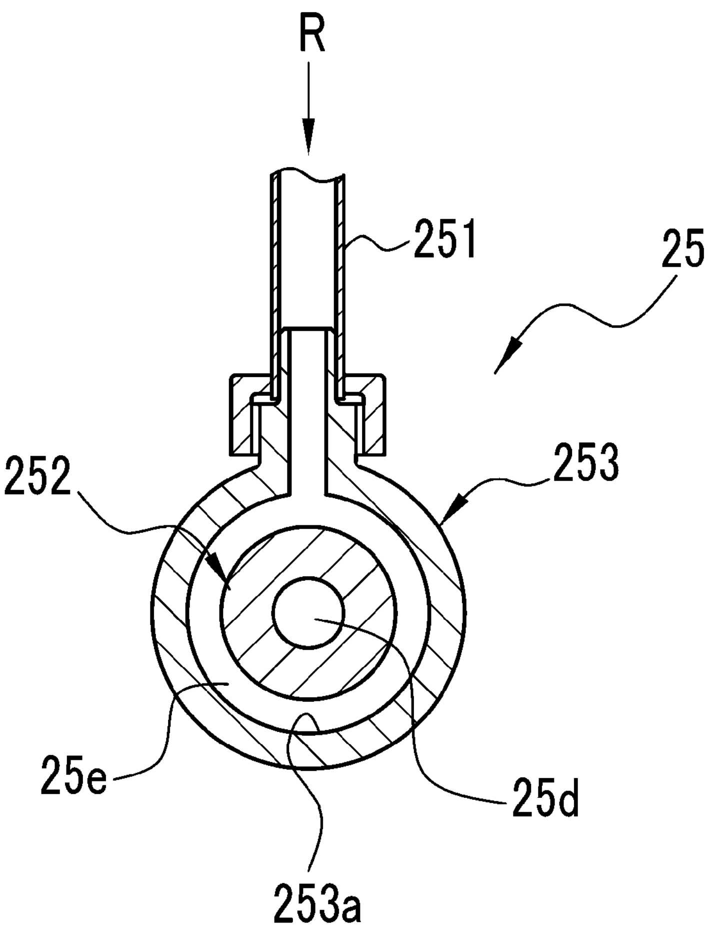
FIG. 8 is a cross-sectional view of the nozzle for cold spray along line VIII-VIII of FIG. 7.

The inner diameter portion 253*a* of the cooling jacket 253 has an inner diameter larger than the outer diameter of the nozzle main body 252. The cooling jacket 253 therefore surrounds the nozzle main body 252, which is inserted from the rear end side, to form a gap between the inner diameter portion 253*a* and the nozzle main body 252. The gap serves as the flow path 25*e* for the refrigerant R. The flow path 25*e* is provided so as to extend from the tip side to the rear end side of the nozzle main body 252. As illustrated in the cross-sectional view of FIG. 8 along the line VIII-VIII of FIG. 7, the flow path 25*e* is provided so as to surround the entire circumference of the nozzle main body 252.

Figure 9:
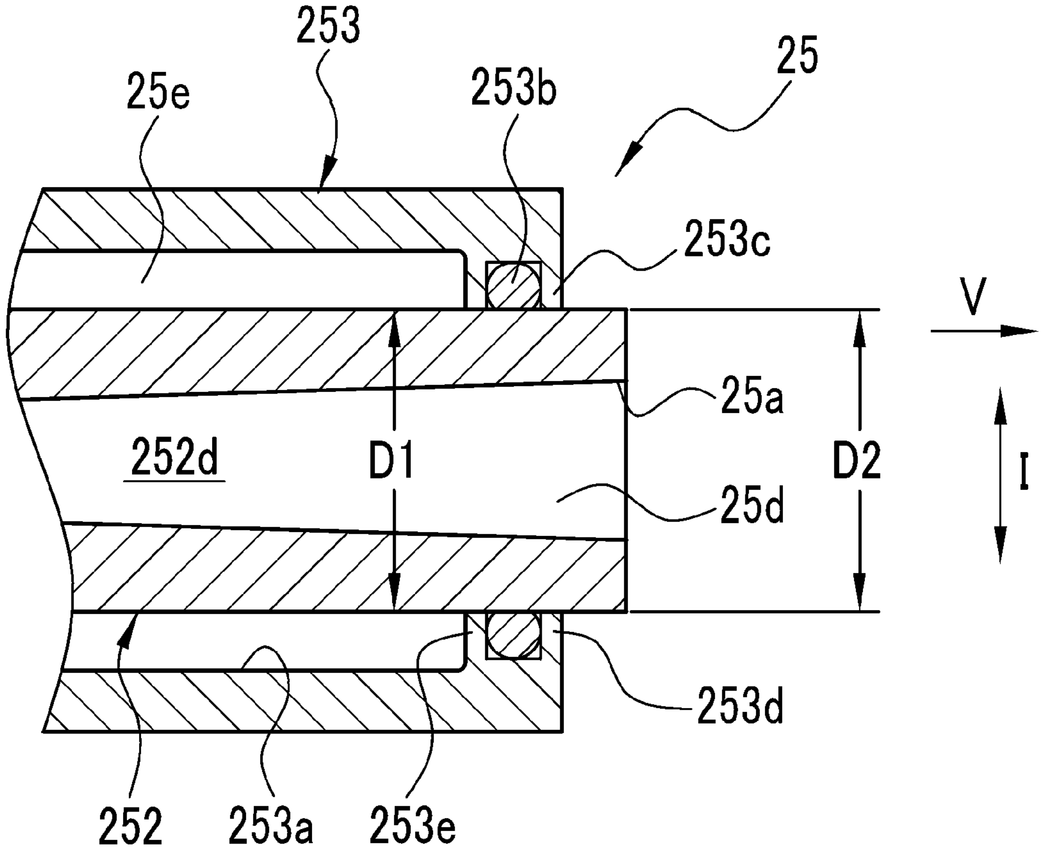
FIG. 9 is an enlarged cross-sectional view illustrating a socket-and-spigot joint portion of the nozzle for cold spray illustrated in FIG. 7.

As illustrated in FIG. 9 in an enlarged manner, a seal retaining portion 253*c* is provided on the tip side of the inner diameter portion 253*a* of the cooling jacket 253. The seal retaining portion 253*c* retains an O-ring 253*b*. The O-ring 253*b*, which corresponds to the seal member of the present invention, is in close contact with the outer peripheral surface of the nozzle main body 252 to seal the flow path 25*e*. The seal retaining portion 253*c* includes a front wall 253*d* and a rear wall 253*e* that are annularly projected from the inner surface of the inner diameter portion 253*a* of the cooling jacket 253 toward the central axis of the cooling jacket 253. The O-ring 253*b* is retained in an annular groove provided between the front wall 253*d* and the rear wall 253*e*.

The nozzle main body 252 receives force that acts in the spraying direction of the raw material powder P due to the frictional force between the spray passage 25*d* and the operation gas which sprays the raw material powder P. The nozzle main body 252 therefore vibrates along the arrow V direction in FIG. 9. The cold spray gun 23 moves and stops moving in order to direct the nozzle for cold spray 25 to the film formation position. At that time, the tip portion of the nozzle main body 252 is misaligned in the I direction approximately orthogonal to the central axis of the nozzle main body 252 due to the inertial force caused when the cold spray gun 23 moves and stops moving.

To suppress the vibration in the V direction and the misalignment in the I direction which occur at the tip portion of the nozzle main body 252 during the film formation, the front wall 253*d* and rear wall 253*e* of the seal retaining portion 253*c* are joined with the outer peripheral surface of the nozzle main body 252 in a socket-and-spigot joint fashion. As used herein, the socket-and-spigot joint refers to a joint in which two members, such as represented by a recessed portion and a projected portion, are fitted without a gap thereby to ensure their relative positions so that no play occurs after the fitting.

Here, with regard to the dimensions and tolerances of the nozzle main body 252 and the seal retaining portion 253*c*, the outer diameter D1 of the nozzle main body 252 is, for example, φ11.2 mm, and the outer diameter tolerance is the minimum +0.02 to +0.04 mm. Additionally or alternatively, the inner diameter D2 of the front wall 253*d* and rear wall 253*e* of the seal retaining portion 253*c*, which is joined with the nozzle main body 252 in the socket-and-spigot joint fashion, is, for example, φ11.3 mm, and the inner diameter tolerance is, for example, −0.01 to −0.03 mm.

The socket-and-spigot joint with such dimensions and tolerances allows the gap generated between the nozzle main body 252 and the seal retaining portion 253*c* to be very small, such as 0.015 to 0.035 mm. The nozzle main body 252 and the seal retaining portion 253*c* can therefore be joined with no play after the fitting while ensuring their relative positions.

Moreover, the nozzle main body 252 and the seal retaining portion 253*c* are joined in the socket-and-spigot joint fashion; therefore, when the nozzle main body 252 is blocked and needs to be replaced, or when the O-ring 253*b* of the seal retaining portion 253*c* deteriorates and needs to be replaced, for example, the nozzle for cold spray 25 can be disassembled to detach the nozzle main body 252 from the cooling jacket 253. The above-described dimensions and tolerances of the nozzle main body 252 and the seal retaining portion 253*c* are merely examples, and it is preferred to appropriately set the tolerances for the socket-and-spigot joint in accordance with the dimensions of the nozzle main body 252 and the seal retaining portion 253*c*.

If it is not necessary to disassemble the nozzle for cold spray 25, or if the disassembly frequency is low, the nozzle main body and the cooling jacket may be joined using interference fit instead of the socket-and-spigot joint. As used herein, the interference fit refers to a joint in which two members, such as represented by a recessed portion and a projected portion, are designed with a slightly larger size of the projected portion than the size of the recessed portion and the projected portion is pressed into and fitted with the recessed part thereby to ensure their relative positions so that no play occurs after the fitting. When the interference fit is applied to the nozzle for cold spray 25, the outer diameter D1 of the nozzle main body 252 is made slightly larger than the inner diameter D2 of the front wall 253*d* and rear wall 253*e* of the seal retaining portion 253*c*, and the nozzle main body 252 is pressed into and fitted with the seal retaining portion 253*c*. Thus, also when using the interference fit, the nozzle main body 252 and the seal retaining portion 253*c* can be joined with no play after the fitting while ensuring their relative positions.

As illustrated in FIG. 7, the cooling jacket 253 also includes a seal retaining portion 253*g* that retains an O-ring 253*f* on the rear end side of the inner diameter portion 253*a*. However, the rear end side of the nozzle main body 252 is supported so that the connecting portion 252*a* is interposed between the cooling jacket 253 and the nozzle attaching portion 231, and the vibration and misalignment occurring on the rear end side are very small as compared with those occurring on the tip side of the nozzle main body 252. For this reason, the seal retaining portion 253*g* of the cooling jacket 253 on the rear end side is not joined with the nozzle main body 252 in a socket-and-spigot joint fashion. The base portion 25*c* of the cooling jacket 253 is provided with a discharge connection path 253*h* that connects the flow path 25*e* to the discharge path 231*f* of the nozzle attaching portion 231.

The refrigerant circulation circuit 27 which circulates the refrigerant R into the flow path 25*e* of the nozzle for cold spray 25 will then be described with reference to FIG. 3. The refrigerant circulation circuit 27 includes the above described introduction pipe 251*b* and discharge pipe 233*b*, a tank 271 that stores the refrigerant R, a pump 272 that is connected to the introduction pipe 251*b* and flows the refrigerant R between the tank 271 and the nozzle for cold spray 25, and a cooler 273 that cools the refrigerant R. The cooler 273, which is composed of a heat exchanger or the like, for example, cools the refrigerant R having a raised temperature after cooling the nozzle main body 252 by exchanging heat between the refrigerant R and a cooling medium such as air, water, or gas.

The refrigerant circulation circuit 27 sucks the refrigerant R in the tank 271 using the pump 272 and supplies the refrigerant R to the refrigerant introduction part 251 via the cooler 273. The refrigerant R supplied to the refrigerant introduction part 251 flows through the flow path 25*e* in the nozzle for cold spray 25 from the tip side to the rear end side, and during that time, exchanges heat with the nozzle main body 252 to cool it. The refrigerant R having flowed to the rear end side of the flow path 25*e* is discharged into the discharge pipe 233*b* via the refrigerant discharge part 233 and returns to the tank 271. Thus, the refrigerant circulation circuit 27 cools the nozzle main body 252 by circulating the refrigerant R while cooling it, and it is therefore possible to suppress the adhesion of the raw material powder P to the spray passage 25*d* of the nozzle main body 252.

Figure 10:
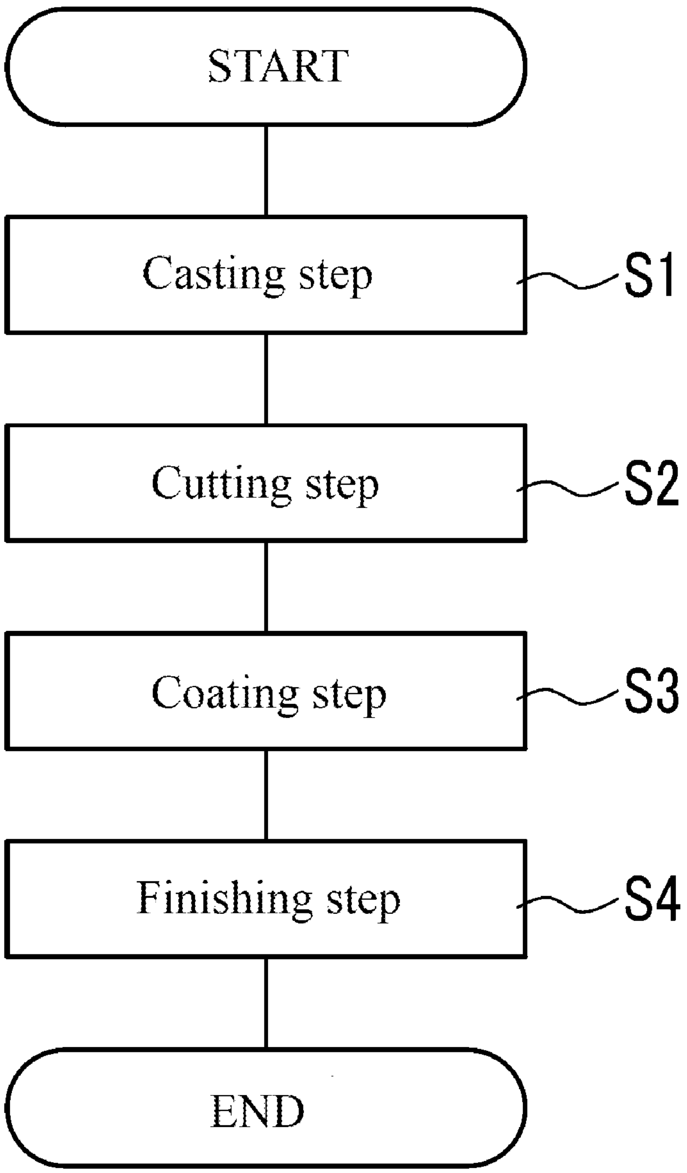
FIG. 10 is a process chart illustrating a procedure of manufacturing a cylinder head using the cold spray apparatus and the nozzle for cold spray according to the first embodiment of the present invention.

A method for manufacturing the cylinder head 12 including the valve seat films 16*b* and 17*b* will then be described. FIG. 10 is a process chart illustrating the processing steps for the valve sites in the method for manufacturing the cylinder head 12 of the present embodiment. As illustrated in this figure, the method for manufacturing the cylinder head 12 of the present embodiment includes a casting step (step S1, a cutting step (step S2), a coating step (step S3), and a finishing step (step S4). Processing steps other than those for the valve sites will be omitted for simplicity of the description.

In the casting step S1, an aluminum alloy for casting is poured into a mold in which sand cores are set, and a semimanufactured cylinder head having intake ports 16 and exhaust ports 17 formed in the main body is cast-molded. The intake ports 16 and the exhaust ports 17 are formed by the sand cores, and the recesses 12*b* are formed by the mold.

Figure 11:
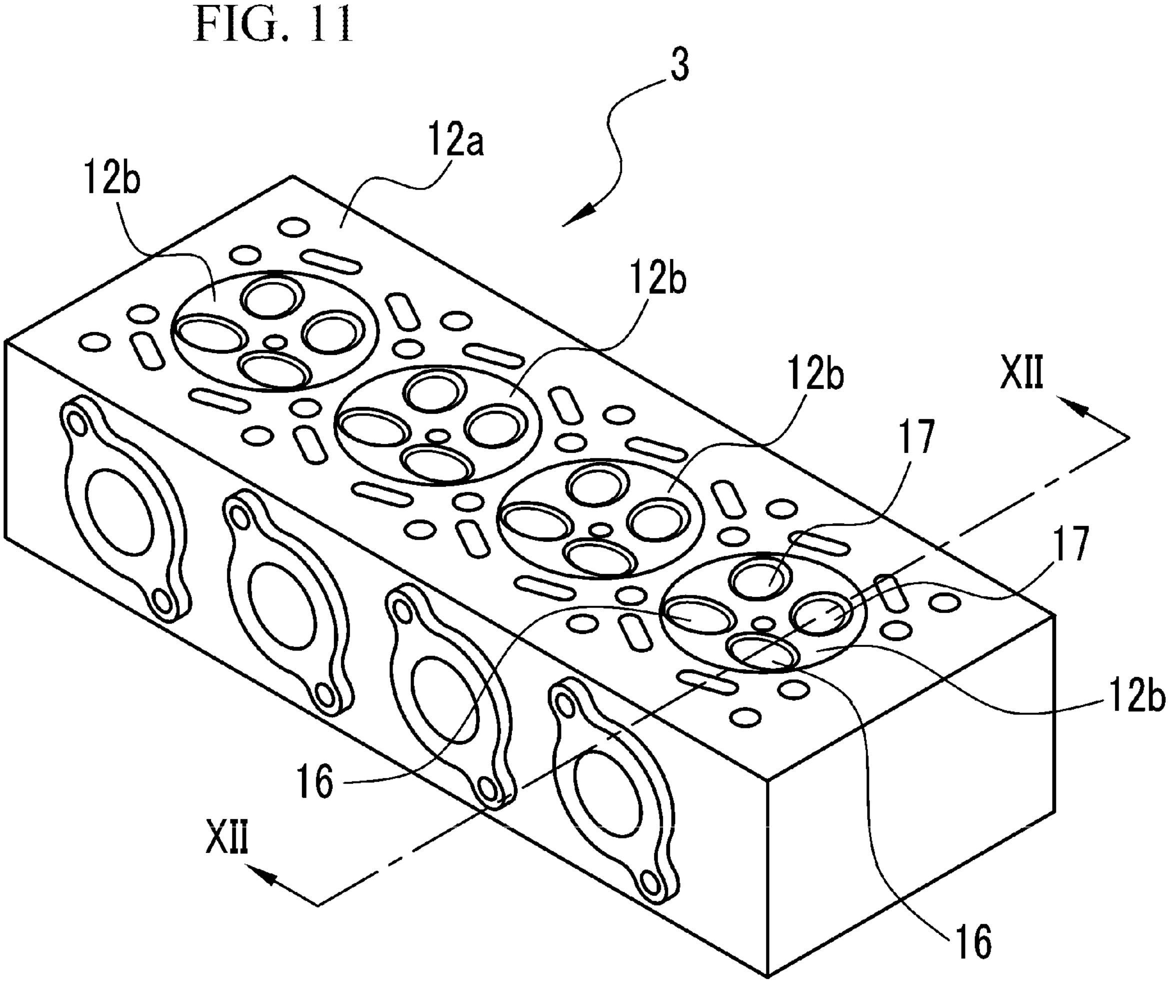
FIG. 11 is a perspective view of a semimanufactured cylinder head in which the valve seat films are formed using the cold spray apparatus and the nozzle for cold spray according to the first embodiment of the present invention.

FIG. 11 is a perspective view of a semimanufactured cylinder head 3 having been cast-molded in the casting step S1 as seen from above the mounting surface 12*a* which is to be mounted to the cylinder block 11. The semimanufactured cylinder head 3 includes four recesses 12*b,* two intake ports 16 and two exhaust ports 17 provided in each recess 12*b,* etc. The two intake ports 16 and two exhaust ports 17 of each recess 12*b* are merged into respective ones in the semimanufactured cylinder head 3, which communicate with openings provided on both side surfaces of the semimanufactured cylinder head 3.

Figure 12A:
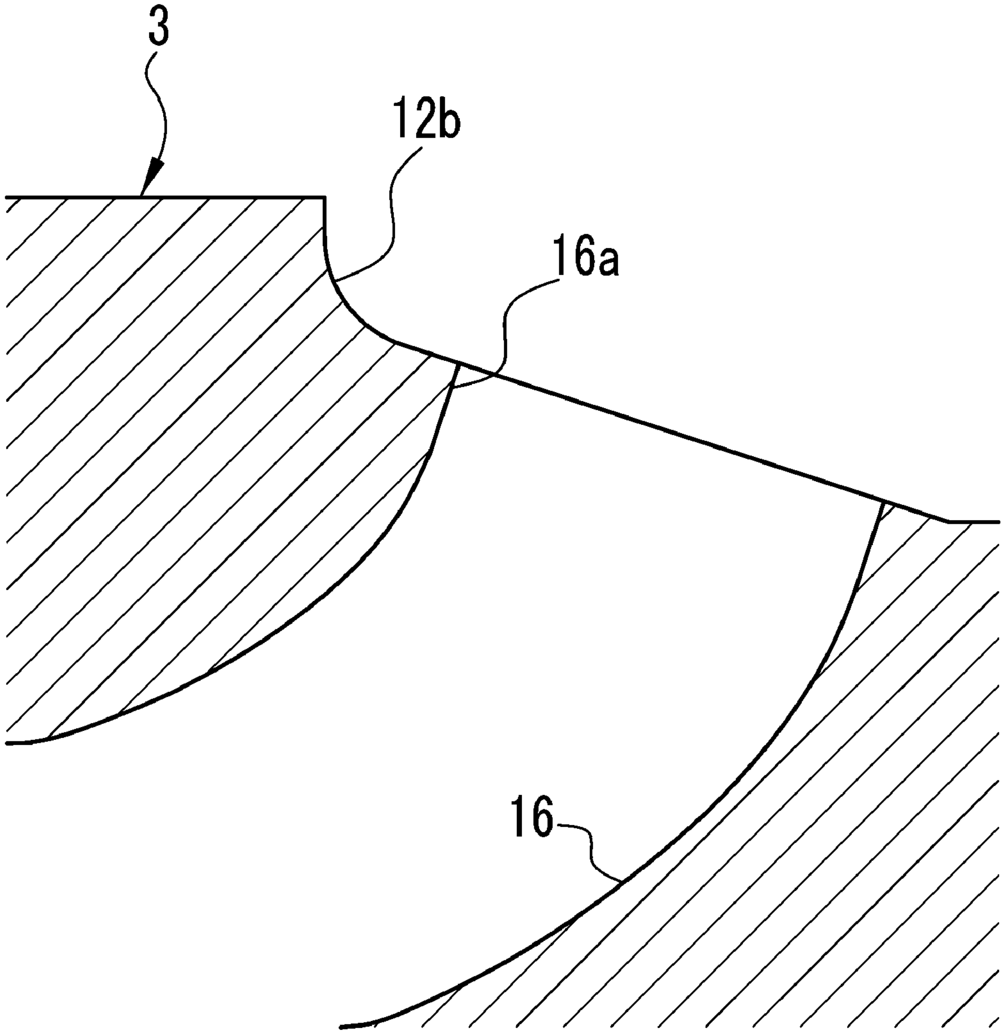
FIG. 12A is a cross-sectional view illustrating an intake port along line XII-XII of FIG. 11.

FIG. 12A is a cross-sectional view of the semimanufactured cylinder head 3 taken along line XII-XII of FIG. 11 and illustrates an intake port 16. The intake port 16 is provided with a circular opening portion 16*a* that is exposed in the recess 12*b* of the semimanufactured cylinder head 3.

Figure 12B:
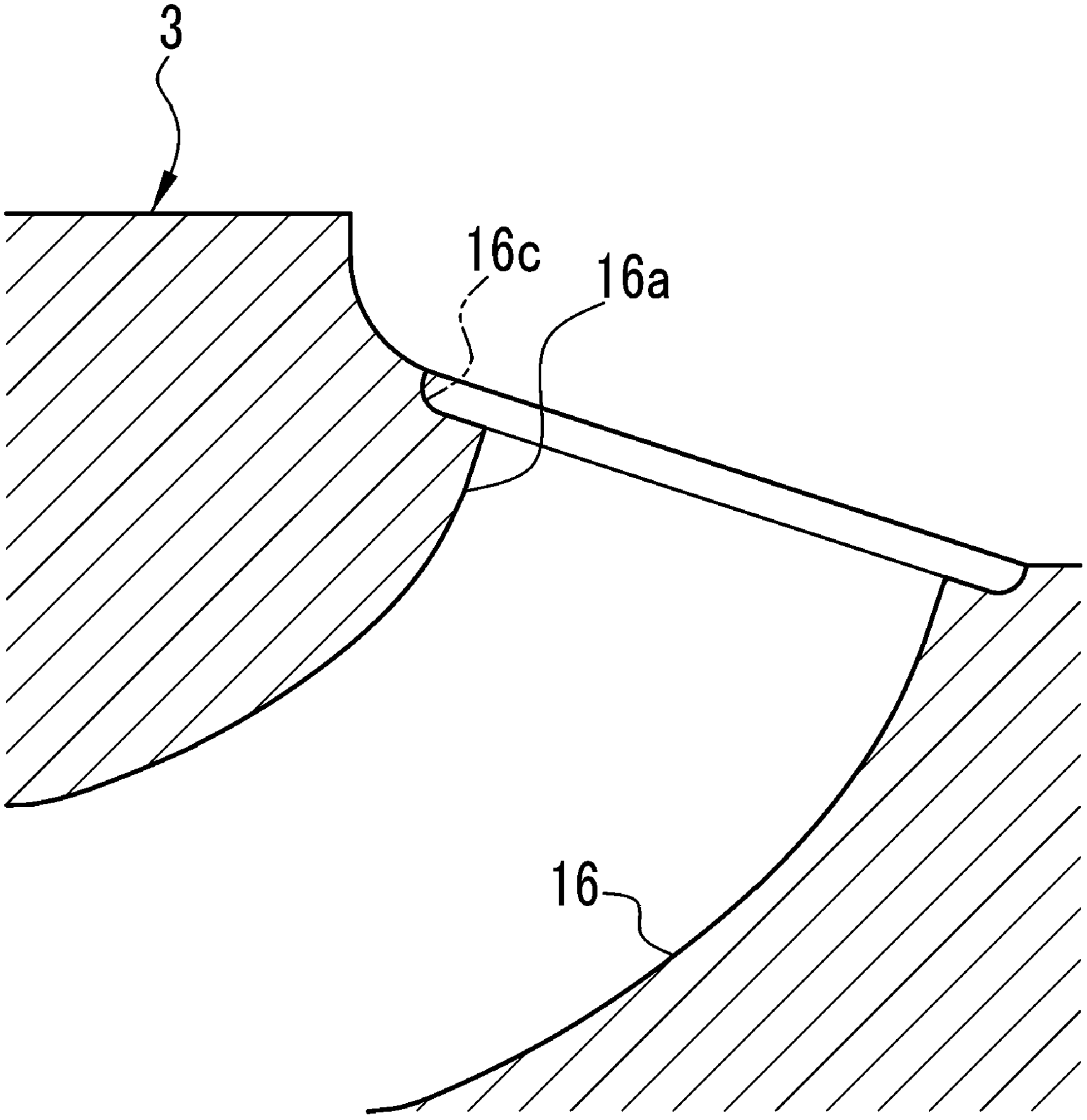
FIG. 12B is a cross-sectional view illustrating a state in which an annular valve seat portion is formed in the intake port of FIG. 12A in a cutting step.

In the subsequent cutting step S2, milling work is performed on the semimanufactured cylinder head 3 as illustrated in FIG. 12B, such as using an end mill or a ball end mill, to form an annular valve seat portion 16*c* around the opening portion 16*a* of the intake port 16. The annular valve seat portion 16*c* is an annular groove that serves as the base shape of a valve seat film 16*b,* and is formed on the outer circumference of the opening portion 16*a.* In the method for manufacturing the cylinder head 12 of the present embodiment, the raw material powder P is sprayed onto the annular valve seat portion 16*c* using the cold spray method to form a film, and the valve seat film 16*b* is formed based on the film. The annular valve seat portion 16*c* is therefore formed with a size slightly larger than the valve seat film 16*b.*

In the coating step S3, the raw material powder P is sprayed onto the annular valve seat portion 16*c* of the semimanufactured cylinder head 3 using the cold spray apparatus 2 of the present embodiment to form the valve seat film 16*b.* More specifically, in the coating step S3, the semimanufactured cylinder head 3 and the nozzle for cold spray 25 are relatively moved at a constant speed so that the raw material powder P is sprayed onto the entire circumference of the annular valve seat portion 16*c* while keeping constant the posture of the annular valve seat portion 16*c* and the nozzle for cold spray 25 of the cold spray gun 23 and the distance between the annular valve seat portion 16*c* and the nozzle for cold spray 25.

Figure 13:
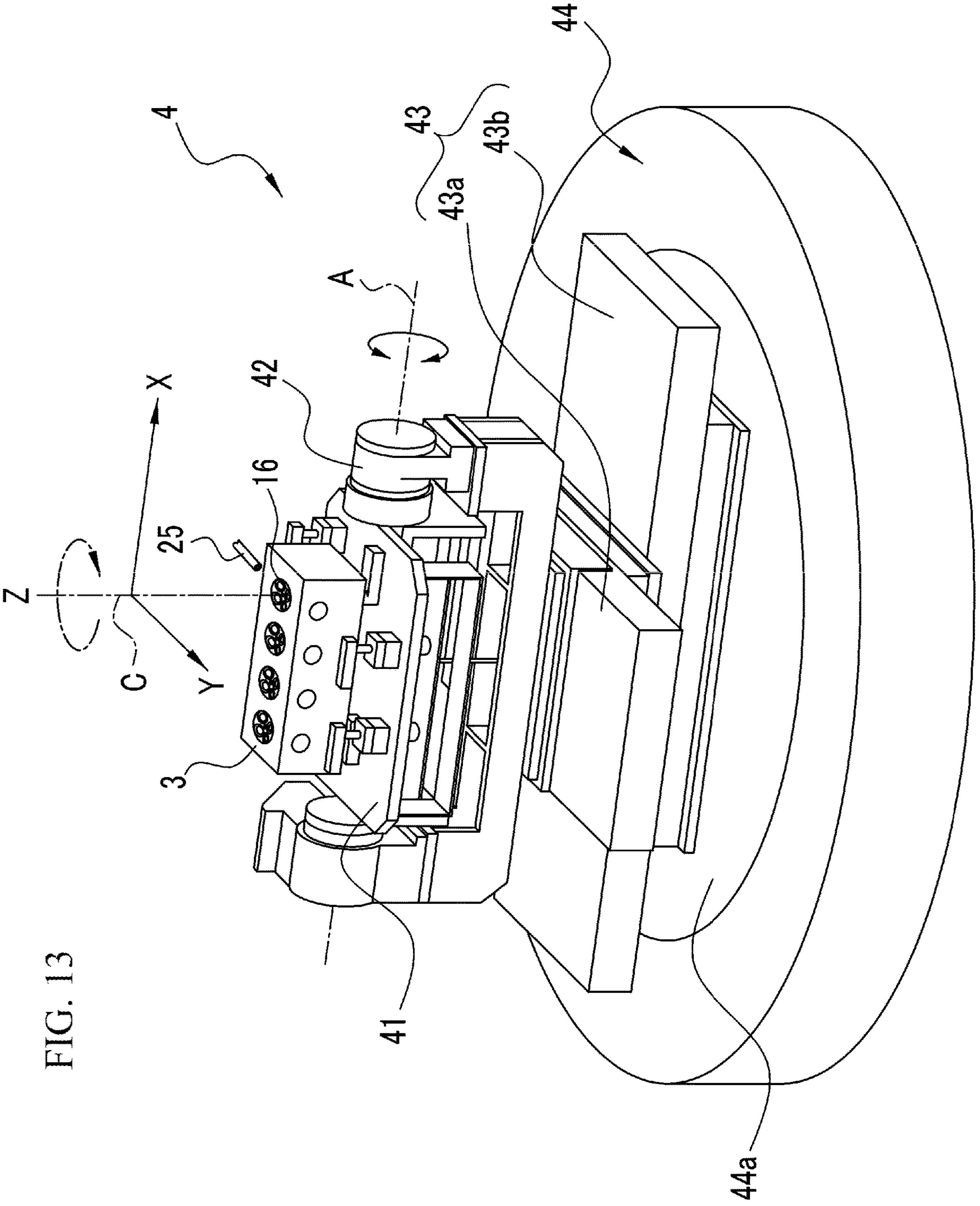
FIG. 13 is a perspective view illustrating the configuration of a work rotating apparatus used for moving the semimanufactured cylinder head in a coating step of FIG. 10.

In this embodiment, for example, the semimanufactured cylinder head 3 is moved with respect to the nozzle for cold spray 25 of the cold spray gun 23, which is fixedly arranged, using a work rotating apparatus 4 illustrated in FIG. 13. The work rotating apparatus 4 includes a work table 41, a tilt stage unit 42, an XY stage unit 43, and a rotation stage unit 44. The work table 41 holds the semimanufactured cylinder head 3.

The tilt stage unit 42 is a stage that supports the work table 41 and rotates the work table 41 around an A-axis arranged in the horizontal direction to tilt the semimanufactured cylinder head 3. The XY stage unit 43 includes a Y-axis stage 43*a* that supports the tilt stage unit 42 and an X-axis stage 43*b* that supports the Y-axis stage 43*a.* The Y-axis stage 43*a* moves the tilt stage unit 42 along the Y-axis arranged in the horizontal direction. The X-axis stage 43*b* moves the Y-axis stage 43*a* along the X-axis orthogonal to the Y-axis on the horizontal plane. This allows the XY stage unit 43 to move the semimanufactured cylinder head 3 to an arbitrary position along the X-axis and the Y-axis. The rotation stage unit 44 has a rotation table 44*a* that supports the XY stage unit 43 on the upper surface, and rotates the rotation table 44*a* thereby to rotate the semimanufactured cylinder head 3 around the Z-axis in an approximately vertical direction.

Figure 14:
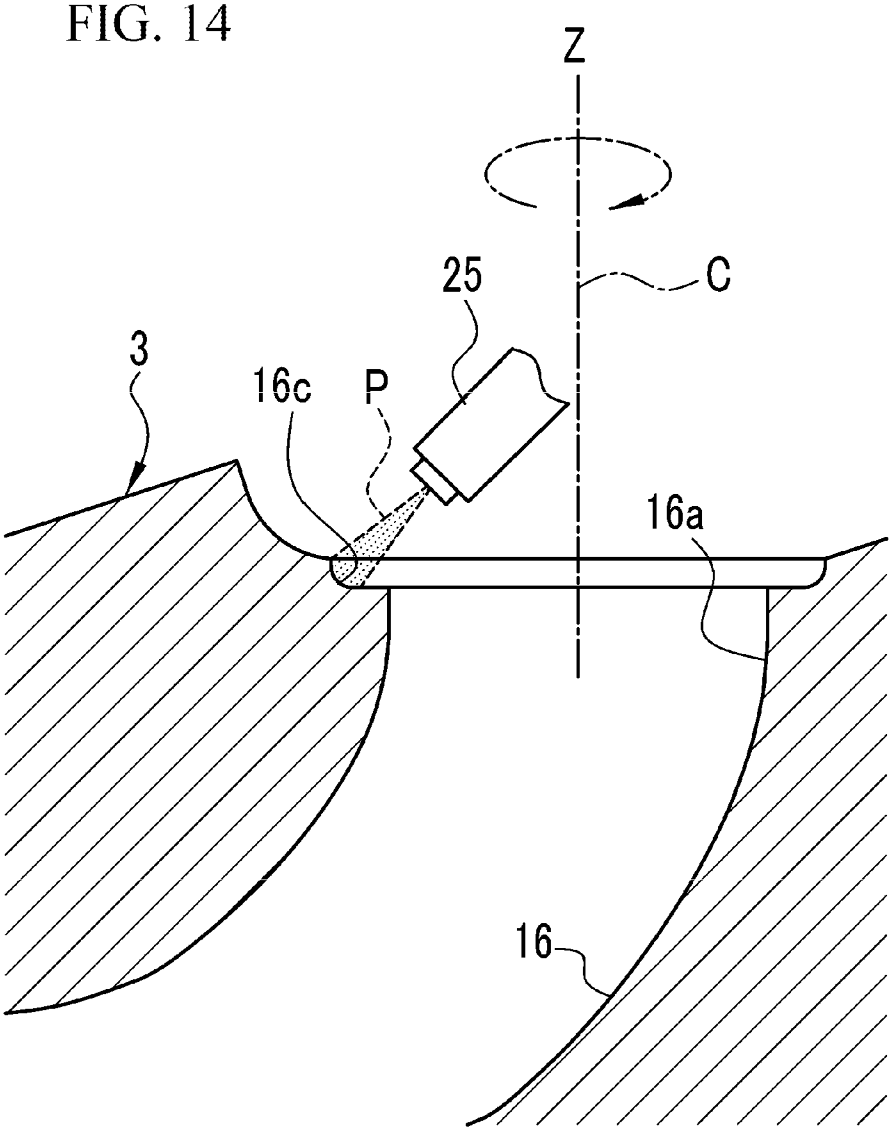
FIG. 14 is a cross-sectional view illustrating a state of forming a valve seat film in the intake port of FIG. 12B using the nozzle for cold spray according to one or more embodiments of the present invention.

The tip of the nozzle for cold spray 25 of the cold spray gun 23 is fixedly arranged above the tilt stage unit 42 and in the vicinity of the Z-axis of the rotation stage unit 44. The work rotating apparatus 4 uses the tilt stage unit 42 to tilt the work table 41 so that, as illustrated in FIG. 14, the central axis C of the intake port 16 to be formed with the valve seat film 16*b* becomes vertical. The work rotating apparatus 4 also uses the XY stage unit 43 to move the semimanufactured cylinder head 3 so that the central axis C of the intake port 16 to be formed with the valve seat film 16*b* coincides with the Z-axis of the rotation stage unit 44. In this state, the rotation stage unit 44 rotates the semimanufactured cylinder head 3 around the Z-axis while the nozzle for cold spray 25 sprays the raw material powder P onto the annular valve seat portion 16*c,* thereby forming a film on the entire circumference of the annular valve seat portion 16*c.*

While the coating step S3 is being carried out, the nozzle for cold spray 25 introduces the refrigerant R supplied from the refrigerant supply unit into the flow path 25*e* via the refrigerant introduction part 251. The refrigerant R cools the nozzle main body 252 while flowing from the tip side toward the rear end side of the flow path 25*e.* The refrigerant R having flowed to the rear end side of the flow path 25*e* is discharged from the flow path 25*e* via the refrigerant discharge part 233 and recovered by the refrigerant recovery unit.

The nozzle main body 252 vibrates along the spraying direction of the raw material powder P, that is, along the arrow V direction of FIG. 9 due to the friction between the spray passage 25*d* and the operation gas which sprays the raw material powder P. Additionally or alternatively, the tip portion of the nozzle main body 252 is misaligned in the direction approximately orthogonal to the central axis of the nozzle main body 252, that is, in the I direction of FIG. 9 due to the inertial force caused when the nozzle for cold spray 25 moves and stops moving. The vibration in the V direction and the misalignment in the I direction of the nozzle main body 252 is suppressed by the socket-and-spigot joint between the outer peripheral surface of the nozzle main body 252 and the seal retaining portion 253*c* of the cooling jacket 253.

The work rotating apparatus 4 temporarily stops the rotation of the rotation stage unit 44 when the semimanufactured cylinder head 3 makes one rotation around the Z-axis to complete the formation of the valve seat film 16*b*. While the rotation is stopped, the XY stage unit 43 moves the semimanufactured cylinder head 3 so that the central axis C of the intake port 16 to be subsequently formed with the valve seat film 16*b* coincides with the Z-axis of the rotation stage unit 44. After the XY stage unit 43 completes the movement of the semimanufactured cylinder head 3, the work rotating apparatus 4 restarts the rotation of the rotation stage unit 44 to form the valve seat film 16*b* for the next intake port 16. This operation is then repeated thereby to form the valve seat films 16*b* and 17*b* for all the intake ports 16 and the exhaust ports 17 of the semimanufactured cylinder head 3. When the valve seat film formation target is switched between an intake port 16 and an exhaust port 17, the tilt stage unit 42 changes the tilt of the semimanufactured cylinder head 3.

In the finishing step S4, finishing work is performed on the valve seat films 16*b* and 17*b*, the intake ports 16, and the exhaust ports 17. In the finishing work performed on the valve seat films 16*b* and 17*b*, the surfaces of the valve seat films 16*b* and 17*b* are cut by milling work using a ball end mill to adjust the valve seat films 16*b* into a predetermined shape.

Figure 15A:
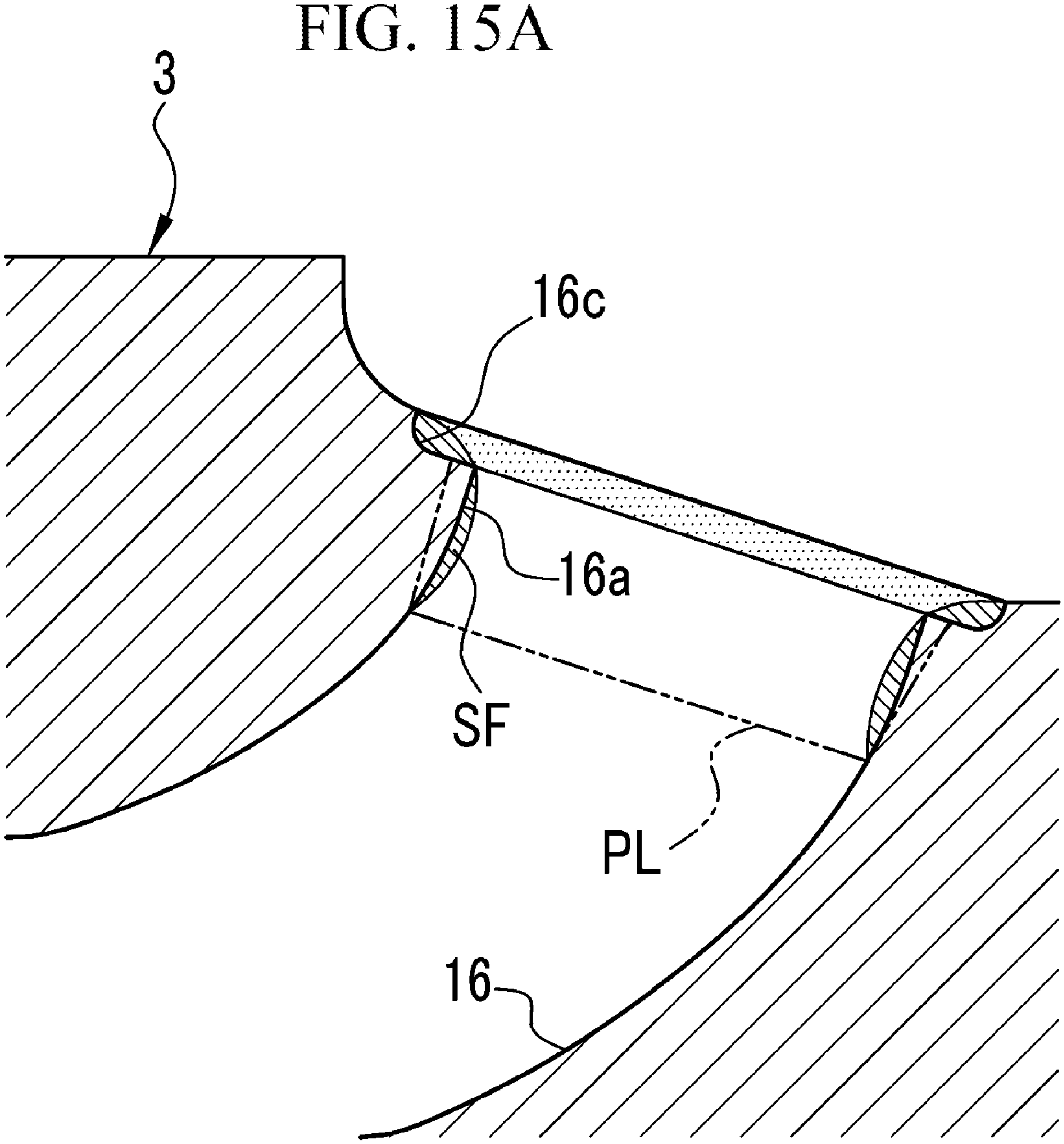
FIG. 15A is a cross-sectional view illustrating the intake port in which the valve seat film is formed using the nozzle for cold spray according to one or more embodiments of the present invention.

In the finishing work performed on the intake ports 16, a ball end mill is inserted from the opening portion 16*a* into each intake port 16 to cut the inner surface of the intake port 16 on the opening port 16*a* side along a working line PL illustrated in FIG. 15A. The working line PL defines a range in which the raw material powder P scatters and adheres in the intake port 16 to form a relatively thick excessive film SF. More specifically, the working line PL refers to a range in which the excessive film SF is formed thick to such an extent that affects the intake performance of the intake port 16.

Figure 15B:
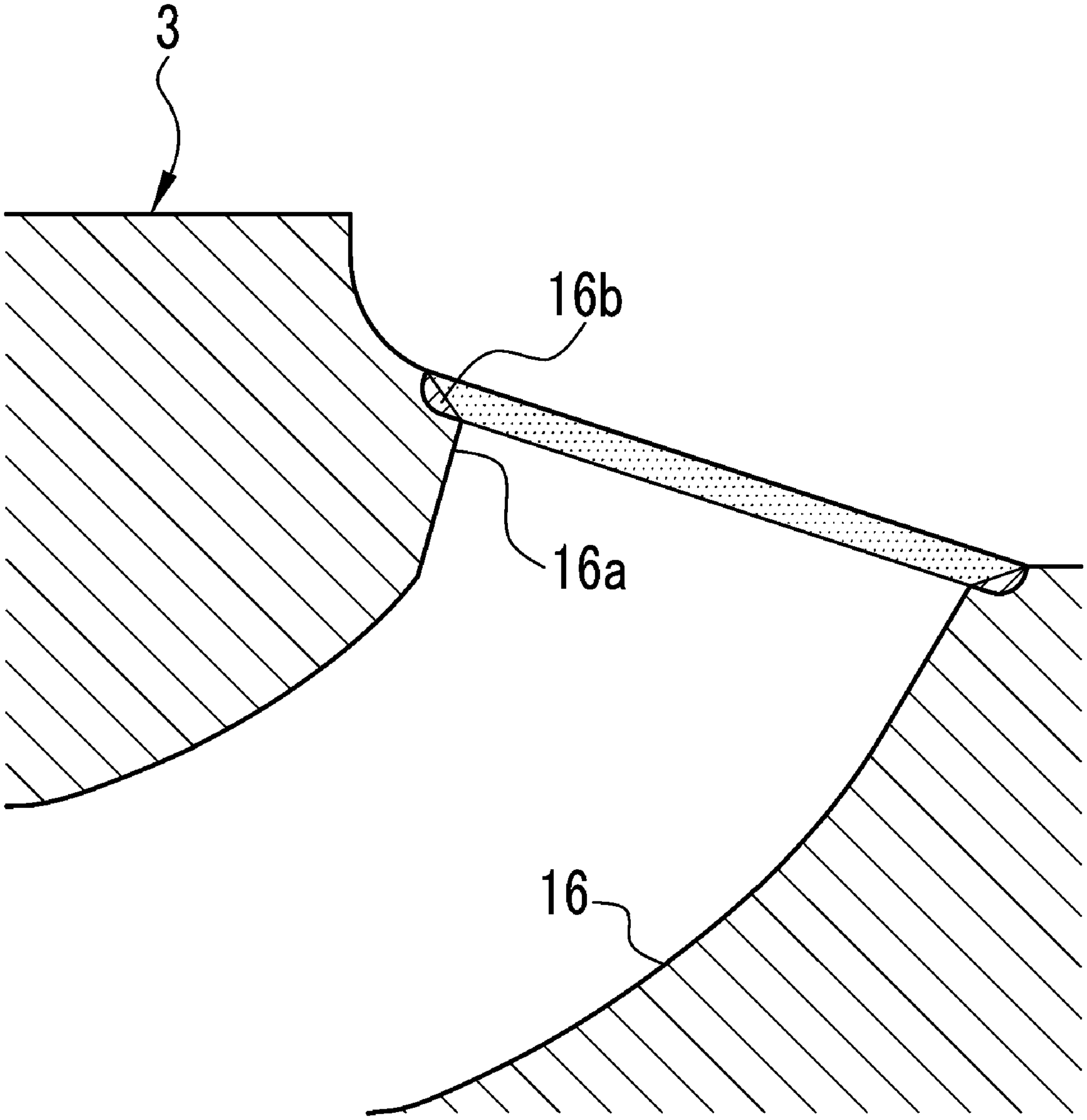
FIG. 15B is a cross-sectional view illustrating the intake port after a finishing step of FIG. 10.

Thus, according to the finishing step S4, the surface roughness of the intake port 16 due to the cast molding is eliminated, and the excessive film SF formed in the coating step S3 can be removed. FIG. 15B illustrates the intake port 16 after the finishing step S4.

Like the intake ports 16, each exhaust port 17 is formed with the valve seat film 17*b* through the formation of a small-diameter portion in the exhaust port 17 by the cast molding, the formation of an annular valve seat portion by the cutting work, the cold spraying onto the annular valve seat portion, and the finishing work. Detailed description will therefore be omitted for the procedure of forming the valve seat films 17*b* on the exhaust ports 17.

As described above, according to the cold spray apparatus 2 and the nozzle for cold spray 25 of the present embodiment, the outer peripheral surface of the nozzle main body 252 and the seal retaining portion 253*c* of the cooling jacket 253 are joined in a socket-and-spigot joint fashion so as not to form a gap, and it is therefore possible to suppress the vibration in the spraying direction of the raw material powder P (V direction of FIG. 9) and the misalignment in the direction approximately orthogonal to the central axis of the nozzle main body 252 (I direction of FIG. 9) which occur in the nozzle main body 252. Moreover, in the cold spray apparatus 2 and the nozzle for cold spray 25 of the present embodiment, even if the vibration in the V direction and/or the misalignment in the I direction occur in the nozzle main body 252, the socket-and-spigot joint between the outer peripheral surface of the nozzle main body 252 and the seal retaining portion 253*c* does not cause a gap at the seal retaining portion 253*c*, and it is therefore possible to prevent the refrigerant R from leaking from the flow path 25*e* of the nozzle for cold spray 25.

The flow rate of the raw material powder P and the operation gas becomes high on the tip side of the nozzle main body 252, and the friction between the spray passage 25*d* and the raw material powder P and operation gas becomes large; therefore, the temperature on the tip side of the nozzle main body 252 is higher than that on the rear end side. Accordingly, the raw material powder P is more likely to adhere to the nozzle main body 252 on the tip side than on the rear end side. However, fortunately, the cold spray apparatus 2 and the nozzle for cold spray 25 of the present embodiment introduce the refrigerant R from the tip side of the nozzle main body 252 into the flow path 25*e* via the refrigerant introduction part 251 provided on the tip side of the nozzle for cold spray 25, and the tip side of the nozzle main body 252 can therefore be effectively cooled using the refrigerant R which does not undergo the temperature rise due to the heat exchange with the nozzle main body 252. It is thus possible to suppress the adhesion and deposition of the raw material powder P to the spray passage 25*d* of the nozzle main body 252.

Furthermore, in the cold spray apparatus 2 and the nozzle for cold spray 25 of the present embodiment, the cooling jacket 253 is attached to the nozzle attaching portion 231 which is the main body portion of the cold spray apparatus 2, and the nozzle main body 252 is supported so that the connecting portion 252*a* on the rear end side is interposed between the cooling jacket 253 and the nozzle attaching portion 231. That is, the cooling jacket 253 is not attached to the nozzle main body 252. Thus, the cooling jacket 253 is not affected by the vibration and misalignment of the nozzle main body 252. The nozzle for cold spray 25 of the present embodiment can therefore effectively suppress the vibration and misalignment of the nozzle main body 252 owing to the cooling jacket 253.

Moreover, in the cold spray apparatus 2 and the nozzle for cold spray 25 of the present embodiment, the flow path 25*e* for the refrigerant R is provided so as to extend from the tip side to the rear end side of the nozzle main body 252 and surround the entire circumference of the nozzle main body 252, and the nozzle main body 252 as a whole can therefore be cooled from the outside. It is thus possible to suppress the adhesion and deposition of the raw material powder P to the spray passage 25*d* of the nozzle main body 252.

SECOND EMBODIMENT

The nozzle for cold spray according to a second embodiment of the present invention will then be described. This embodiment is different from the first embodiment in a form of the socket-and-spigot joint portion between the nozzle main body and the seal retaining portion of the cooling jacket, but other configurations are the same as those in the first embodiment, so the detailed description of the same configurations as those in the first embodiment will be omitted with the use of the same reference numerals.

Figure 16:
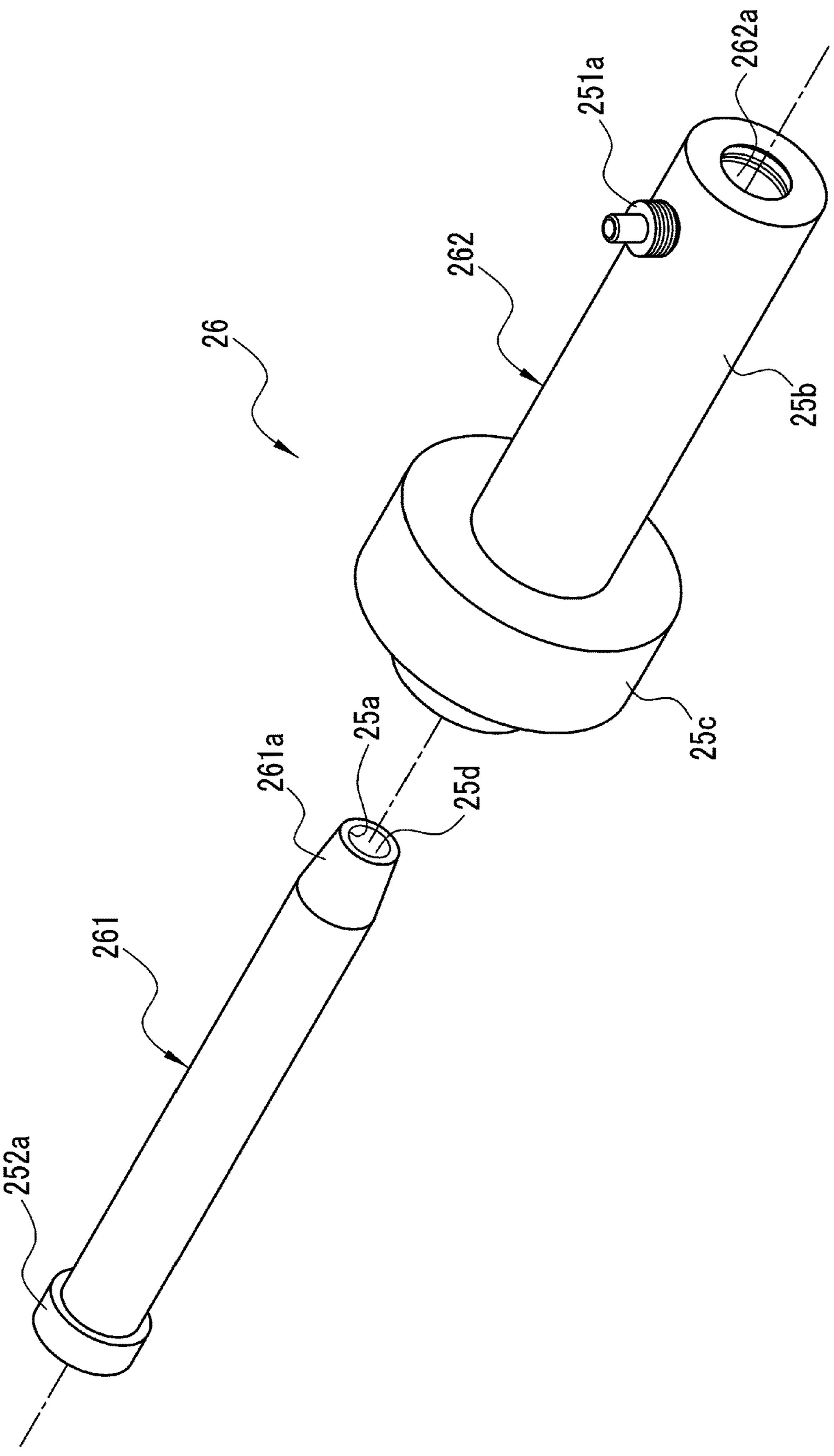
FIG. 16 is a perspective view illustrating a nozzle for cold spray according to a second embodiment of the present invention in which the tip portion of a nozzle main body is formed with a tapered portion.

FIG. 16 is an exploded perspective view illustrating the configuration of a nozzle for cold spray 26 according to the present embodiment. The nozzle for cold spray 26 includes a nozzle main body 261 and a cooling jacket 262. The outer peripheral surface of the nozzle main body 261 on the tip side is formed with a tapered portion 261*a* that gradually tapers in the spraying direction of the raw material powder P. That is, the diameter of the tapered portion 261*a* gradually decreases in the spraying direction of the raw material powder P. The tapered portion 261*a* corresponds to the portion of the nozzle main body to be joined with the seal retaining portion in the present invention.

Figure 17:
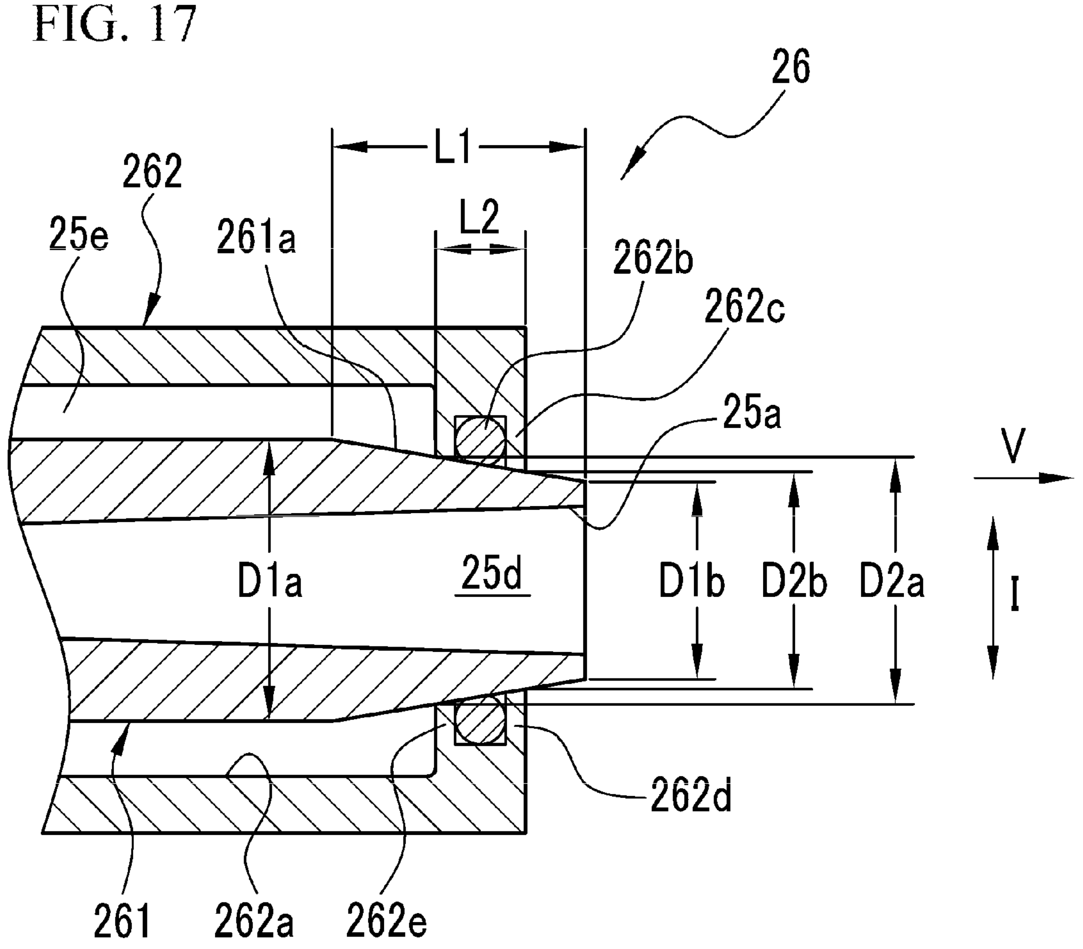
FIG. 17 is an enlarged cross-sectional view illustrating a socket-and-spigot joint portion of the nozzle for cold spray according to the second embodiment of the present invention.

FIG. 17 illustrates the tip portion of the nozzle for cold spray 26 in the cross-sectional view in which the nozzle for cold spray 26 is cut in the spraying direction of the raw material powder P. A seal retaining portion 262*c* is provided on the tip side of an inner diameter portion 262*a* of the cooling jacket 262. The seal retaining portion 262*c* retains an O-ring 262*b*. The O-ring 262*b*, which corresponds to the seal member of the present invention, is in close contact with the tapered portion 261*a* of the nozzle main body 261 to seal the flow path 25*e*. The seal retaining portion 262*c* includes a front wall 262*d* and a rear wall 262*e* that are annularly projected from the inner surface of the inner diameter portion 262*a* of the cooling jacket 262 toward the central axis of the cooling jacket 262. The O-ring 262*b* is retained in an annular groove provided between the front wall 262*d* and the rear wall 262*e*. The front wall 262*d* and rear wall 262*e* of the seal retaining portion 262*c* correspond to the joint part of the seal retaining portion of the present invention.

To suppress the vibration in the V direction and the misalignment in the I direction which occur at the tip portion of the nozzle main body 261 during the film formation, the front wall 262*d* and rear wall 262*e* of the seal retaining portion 262*c* are joined with the tapered portion 261*a* of the nozzle main body 261 in a socket-and-spigot joint fashion. That is, the front wall 262*d* and rear wall 262*e* of the seal retaining portion 262*c* have tapered shapes along the tapered portion 261*a* of the nozzle main body 261, and the seal retaining portion 262*c* of the cooling jacket 262 and the tapered portion 261*a* of the nozzle main body 261 are therefore fitted without a gap thereby to ensure their relative positions so that no play occurs after the fitting.

Here, the dimensions and tolerances of the nozzle main body 261 and the seal retaining portion 262*c* will be described. In the nozzle main body 261, the length L1 of the tapered portion 261*a* may be 10 mm, the outer diameter D1*a* of the large-diameter part of the tapered portion 261*a* may be φ11.2 mm, and the outer diameter D1*b* of the small-diameter part of the tapered portion 261*a* may be φ10.2 mm. The outer diameter tolerance of the outer diameters D1*a* and D1*b* may be +0.02 to +0.04 mm. Additionally or alternatively, in the seal retaining portion 262*c* which is joined with the nozzle main body 261 in a socket-and-spigot joint fashion, the length L2 may be 5 mm, the inner diameter D2*a* of the large-diameter part may be φ11.2 mm, and the inner diameter D2*b* of the small-diameter part may be φ10.7 mm. The inner diameter tolerance of the inner diameter D2*a* may be −0.01 to −0.03 mm, and the inner diameter tolerance of the inner diameter D2*b* may be +0.02 to +0.04 mm.

The socket-and-spigot joint with such dimensions and tolerances allows the gap generated between the nozzle main body 261 and the seal retaining portion 262*c* to be very small, such as several dozen μm. The nozzle main body 261 and the seal retaining portion 262*c* can therefore be joined with no play after the fitting while ensuring their relative positions.

As described above, according to the cold spray apparatus 2 and the nozzle for cold spray 26 of the present embodiment, the nozzle main body 261 is formed with the tapered portion 261*a* which gradually tapers in the spraying direction of the raw material powder P, and the seal retaining portion 262*c* of the cooling jacket 262 has a tapered shape along the tapered portion 261*a* of the nozzle main body 261; therefore, when vibration in the spraying direction of the raw material powder P (V direction of FIG. 17) occurs in the nozzle main body 261, the socket-and-spigot joint between the tapered portion 261*a* and the seal retaining portion 262*c* is more tightened. Thus, the nozzle for cold spray 26 of the present embodiment can prevent the refrigerant R from leaking from the flow path 25*e*.

Moreover, according to the cold spray apparatus 2 and the nozzle for cold spray 26, the tapered portion 261*a* of the nozzle main body 261 and the seal retaining portion 262*c* of the cooling jacket 262 are joined in a socket-and-spigot joint fashion so as not to form a gap, and it is therefore possible to suppress the vibration in the V direction and the misalignment in the direction approximately orthogonal to the central axis of the nozzle main body 261 (I direction of FIG. 17) which occur in the nozzle main body 261. Moreover, in the cold spray apparatus 2 and the nozzle for cold spray 26 of the present embodiment, even if the vibration in the V direction and/or the misalignment in the I direction occur in the nozzle main body 261, the socket-and-spigot joint between the outer peripheral surface of the nozzle main body 261 and the seal retaining portion 262*c* does not cause a gap at the seal retaining portion 262*c*, and it is therefore possible to prevent the refrigerant R from leaking from the flow path 25*e* of the nozzle for cold spray 26.

In the above first embodiment, the nozzle main body 252 and the seal retaining portion 253*g* of the cooling jacket 253 on the rear end side are not joined in a socket-and-spigot joint fashion, but if there is a concern that the refrigerant R may leak from this portion, the nozzle main body 252 and the seal retaining portion 253*g* may be joined in a socket-and-spigot joint fashion. The first embodiment has been described for an example of the small nozzle for cold spray 25 suitable for the film formation on a site having a relatively small area, such as the valve seat films 16*b* and 17*b* of the cylinder head 12, but the present invention can also be applied to a nozzle for cold spray that is used for repair and the like of metal mechanical components and structural components and thus used for the film formation on a relatively large area. Furthermore, water has been described as an example of the refrigerant R, but a liquid other than water or a gaseous matter such as a gas may also be used as the refrigerant.

DESCRIPTION OF REFERENCE NUMERALS

1 Internal-combustion engine
- 12 Cylinder head
- 16 Intake port
  - 16*a* Opening portion
  - 16*b* Valve seat film
  - 16*c* Annular valve seat portion
- 17 Exhaust port
  - 17*a* Opening portion
  - 17*b* Valve seat film
- 18 Intake valve
- 19 Exhaust valve

2 Cold spray apparatus
- 21 Gas supply unit
- 22 Raw material powder supply unit

23 Cold spray gun
231 Nozzle attaching portion
232 Nozzle fixing ring
233 Refrigerant discharge part
25 Nozzle for cold spray
25*a* Spray port
25*d* Spray passage
25*e* Flow path
251 Refrigerant introduction part
252 Nozzle main body
252*a* Connecting portion
253 Cooling jacket
253*b* O-ring
253*c* Seal retaining portion
253*d* Front wall
253*e* Rear wall
26 Nozzle for cold spray
261 Nozzle main body
261*a* Tapered portion
262 Cooling jacket
262*b* O-ring
262*c* Seal retaining portion
262*d* Front wall
262*e* Rear wall

The invention claimed is:

1. A nozzle for cold spray, the nozzle comprising:

a tubular nozzle main body having heat conductivity, the tubular nozzle main body configured to spray a raw material powder supplied from a cold spray apparatus, the tubular nozzle main body comprising:

a connecting portion having a first diameter, and a rear end portion contiguous with the connecting portion and having a second diameter, the second diameter less than the first diameter; and a cooling jacket surrounding the tubular nozzle main body and forming a flow path for refrigerant between the tubular nozzle main body and the cooling jacket, the cooling jacket being configured to cool the tubular nozzle main body via the refrigerant flowing through the flow path, the cooling jacket comprising:

a first seal retaining portion on a tip side of the tubular nozzle main body, and a second seal retaining portion on a rear end side of the tubular nozzle main body;

a first seal member retained by the first seal retaining portion and directly contacting a tip portion of the tubular nozzle main body; and a second seal member retained by the second seal retaining portion and directly contacting the rear end portion, the second seal member positioned between the connecting portion and the tip portion;

wherein the first seal retaining portion is joined with the tip portion of the tubular nozzle main body in a socket-and-spigot joint fashion.

2. The nozzle of claim 1, wherein:

a portion of the tubular nozzle main body joined with the first seal retaining portion in the socket-and-spigot joint fashion has a tapered shape that tapers in a spraying direction of the raw material powder such that an outer diameter of the portion of the tubular nozzle main body decreases in the spraying direction; and a joint part of the first seal retaining portion joined with the portion of the tubular nozzle main body in the socket-and-spigot joint fashion has a tapered shape along the portion of the tubular nozzle main body.

3. The nozzle of claim 1, further comprising:

a refrigerant introduction part arranged to introduce the refrigerant from the tip side of the tubular nozzle main body into the flow path provided from the tip side to a rear end side of the tubular nozzle main body; and a refrigerant discharge part configured to discharge the refrigerant from the rear end side of the tubular nozzle main body.

4. The nozzle of claim 1, wherein: the cooling jacket is configured to attach to a main body portion of the cold spray apparatus, and the tubular nozzle main body is interposed and supported between the cooling jacket and the main body portion.

5. A cold spray apparatus comprising:

a raw material powder supply configured to supply the raw material powder;

a gas supply configured to supply a carrier gas for carrying the raw material powder supplied from the raw material powder supply and an operation gas for spraying the raw material powder; and a sprayer including the nozzle of claim 1, the sprayer configured to spray the raw material powder carried by the carrier gas from the nozzle for cold spray, such that the raw material powder is sprayed as a supersonic flow by the operation gas.

6. A nozzle for cold spray, the nozzle comprising:

a tubular nozzle main body having heat conductivity;

a cooling jacket surrounding the tubular nozzle main body and forming a flow path for refrigerant between the tubular nozzle main body and the cooling jacket; and a seal member;

wherein the cooling jacket is configured to cool the tubular nozzle main body via the refrigerant flowing through the flow path;

wherein the cooling jacket comprises:

an inner diameter portion, and a seal retaining portion on a rear end side of the tubular nozzle main body, the seal retaining portion comprising a front wall and a rear wall that project annularly inward from an inner surface of the inner diameter portion;

wherein the seal member is retained by the seal retaining portion in an annular groove between the front wall and the rear wall, the seal retaining portion directly contacting a rear end portion of the tubular nozzle main body; and wherein the cooling jacket is joined with the tip portion in a socket-and-spigot joint fashion.

* * * * *